(12) United States Patent
Fuglevand et al.

(10) Patent No.: US 7,833,645 B2
(45) Date of Patent: Nov. 16, 2010

(54) PROTON EXCHANGE MEMBRANE FUEL CELL AND METHOD OF FORMING A FUEL CELL

(75) Inventors: William A. Fuglevand, Spokane, WA (US); Shibli Hanna I. Bayyuk, Spokane, WA (US); Matthew M. Wright, Spokane, WA (US)

(73) Assignee: ReliOn, Inc., Spokane, WA (US)

( * ) Notice: Subject to any disclaimer, the term of this patent is extended or adjusted under 35 U.S.C. 154(b) by 1279 days.

(21) Appl. No.: 11/284,173

(22) Filed: Nov. 21, 2005

(65) Prior Publication Data

US 2007/0117005 A1 May 24, 2007

(51) Int. Cl.
*H01M 4/02* (2006.01)
*H01M 8/02* (2006.01)

(52) U.S. Cl. .......................... 429/34; 429/523; 429/532

(58) Field of Classification Search ........................ None
See application file for complete search history.

(56) References Cited

U.S. PATENT DOCUMENTS

| | | | |
|---|---|---|---|
| 3,061,658 A | 10/1962 | Blackmer | |
| 3,183,123 A | 5/1965 | Haworth | |
| 3,297,487 A | 1/1967 | Pomeroy et al. | |
| 3,346,421 A | 10/1967 | Thompson et al. | |
| 3,380,856 A | 4/1968 | Pohl | |
| 3,645,796 A | 2/1972 | Bohm et al. | |
| 4,017,426 A | 4/1977 | Carbonnel et al. | |
| 4,076,899 A | 2/1978 | Kring | |
| 4,243,508 A | 1/1981 | Dankese | |
| 4,252,868 A | 2/1981 | Bohm et al. | |
| 4,324,636 A | 4/1982 | Dankese | |
| 4,324,844 A | 4/1982 | Kothmann | |
| 4,444,851 A | 4/1984 | Maru | |
| 4,508,793 A | 4/1985 | Kumata et al. | |
| H000016 H | * 1/1986 | Kaun | ......................... 429/474 |
| 4,746,363 A | * 5/1988 | DeAngelis | ................... 75/244 |
| 4,982,309 A | 1/1991 | Shepherd | |
| 4,983,472 A | 1/1991 | Katz et al. | |

(Continued)

FOREIGN PATENT DOCUMENTS

EP 1498971 1/2005

(Continued)

OTHER PUBLICATIONS

U.S. Appl. No. 11/801,952, Including O/As dated Sep. 29, 2005; May 11, 2010, and any future Office Actions.

(Continued)

*Primary Examiner*—Patrick Ryan
*Assistant Examiner*—Alix Echelmeyer

(57) ABSTRACT

A proton exchange membrane fuel cell and method for forming a fuel cell is disclosed and which includes, in its broadest aspect, a proton exchange membrane having opposite anode and cathode sides; and individual electrodes juxtaposed relative to each of the anode and cathode sides, and wherein at least one of the electrodes is fabricated, at least in part, of a porous, electrically conductive ceramic material. The present methodology, as disclosed, includes the steps of providing a pair of electrically conductive ceramic substrates, applying a catalyst coating to the inside facing surface thereof; and providing a polymeric proton exchange membrane, and positioning the polymeric proton membrane therebetween, and in ohmic electrical contact relative thereto to form a resulting PEM fuel cell.

21 Claims, 11 Drawing Sheets

U.S. PATENT DOCUMENTS

| | | |
|---|---|---|
| 5,053,294 A | 10/1991 | Sernka et al. |
| 5,069,985 A | 12/1991 | Cohen et al. |
| 5,094,928 A | 3/1992 | Dyer |
| 5,117,482 A | 5/1992 | Hauber |
| 5,132,193 A | 7/1992 | Reddy et al. |
| 5,187,025 A | 2/1993 | Kelland et al. |
| 5,232,792 A | 8/1993 | Reznikov |
| 5,242,764 A | 9/1993 | Dhar |
| 5,252,410 A | 10/1993 | Wilkinson et al. |
| 5,273,837 A | 12/1993 | Aitken et al. |
| 5,286,579 A | 2/1994 | Akagi |
| 5,292,600 A | 3/1994 | Kaufman |
| 5,364,711 A | 11/1994 | Yamada et al. |
| 5,419,980 A | 5/1995 | Okamoto et al. |
| 5,462,815 A | 10/1995 | Horiuchi |
| 5,470,671 A | 11/1995 | Fletcher et al. |
| 5,470,672 A | 11/1995 | Naoumidis |
| 5,482,792 A | 1/1996 | Faita et al. |
| 5,484,666 A | 1/1996 | Gibb et al. |
| 5,486,430 A | 1/1996 | Gorbell et al. |
| 5,514,487 A | 5/1996 | Washington et al. |
| 5,534,362 A | 7/1996 | Okamoto et al. |
| 5,543,239 A | 8/1996 | Virkar et al. |
| 5,543,240 A | 8/1996 | Lee et al. |
| 5,547,776 A | 8/1996 | Fletcher et al. |
| 5,547,777 A | 8/1996 | Richards |
| 5,565,072 A | 10/1996 | Faita et al. |
| 5,578,388 A | 11/1996 | Faita et al. |
| 5,624,769 A | 4/1997 | Li et al. |
| 5,629,104 A | 5/1997 | Crawford, Sr. et al. |
| 5,686,200 A | 11/1997 | Barton et al. |
| 5,736,269 A | 4/1998 | Okamoto et al. |
| 5,747,185 A | 5/1998 | Hsu |
| 5,750,281 A | 5/1998 | Washington et al. |
| 5,789,091 A | 8/1998 | Wozniczka et al. |
| 5,798,187 A | 8/1998 | Wilson et al. |
| 5,827,602 A | 10/1998 | Koch et al. |
| 5,863,671 A | 1/1999 | Spear, Jr. et al. |
| 5,879,826 A | 3/1999 | Lehman et al. |
| 5,925,039 A | 7/1999 | Landingham |
| 5,964,991 A | 10/1999 | Kawasaki et al. |
| 5,972,530 A | 10/1999 | Shelekhin et al. |
| 6,001,502 A | 12/1999 | Walsh |
| 6,022,634 A | 2/2000 | Ramunni et al. |
| 6,024,848 A | 2/2000 | Dufner et al. |
| 6,025,457 A | 2/2000 | Ohno et al. |
| 6,030,718 A | 2/2000 | Fuglevand et al. |
| 6,037,072 A | 3/2000 | Wilson et al. |
| 6,037,073 A | 3/2000 | Besmann et al. |
| 6,040,072 A | 3/2000 | Murphy et al. |
| 6,040,076 A | 3/2000 | Reeder |
| 6,042,955 A | 3/2000 | Okamoto |
| 6,042,959 A | 3/2000 | Debe et al. |
| 6,066,409 A | 5/2000 | Ronne et al. |
| 6,110,612 A | 8/2000 | Walsh |
| 6,117,287 A | 9/2000 | Molter et al. |
| 6,124,051 A | 9/2000 | Johnson |
| 6,143,675 A | 11/2000 | McCollam et al. |
| 6,146,780 A | 11/2000 | Cisar et al. |
| 6,146,781 A | 11/2000 | Surampudi et al. |
| 6,171,720 B1 | 1/2001 | Besmann et al. |
| 6,174,616 B1 | 1/2001 | Marvin et al. |
| 6,180,274 B1 | 1/2001 | Yoshimoto et al. |
| 6,183,896 B1 | 2/2001 | Horita et al. |
| 6,194,095 B1 | 2/2001 | Hockaday |
| 6,207,310 B1 | 3/2001 | Wilson et al. |
| 6,218,039 B1 | 4/2001 | Mease et al. |
| 6,235,168 B1 | 5/2001 | Strutt et al. |
| 6,248,469 B1 | 6/2001 | Formato et al. |
| RE37,284 E | 7/2001 | Li et al. |
| 6,280,870 B1 | 8/2001 | Eisman et al. |
| 6,280,883 B1 | 8/2001 | Lamanna et al. |
| 6,297,185 B1 | 10/2001 | Thompson et al. |
| 6,322,919 B1 | 11/2001 | Yang et al. |
| 6,358,641 B1 | 3/2002 | Mease |
| 6,372,376 B1 | 4/2002 | Fronk et al. |
| 6,403,245 B1 | 6/2002 | Hunt |
| 6,425,993 B1 | 7/2002 | Debe et al. |
| 6,468,682 B1 | 10/2002 | Fuglevand et al. |
| 6,492,047 B1 | 12/2002 | Peled et al. |
| 6,497,975 B2 | 12/2002 | Bostaph et al. |
| 6,503,654 B2 | 1/2003 | Marchetti |
| 6,524,452 B1 | 2/2003 | Clark et al. |
| 6,531,238 B1 | 3/2003 | King |
| 6,531,241 B1 | 3/2003 | McEwen |
| 6,544,679 B1 | 4/2003 | Petillo et al. |
| 6,602,631 B1 | 8/2003 | Cisar et al. |
| 6,613,468 B2 | 9/2003 | Simpkins et al. |
| 6,638,657 B1 | 10/2003 | Cisar et al. |
| 6,649,031 B1 | 11/2003 | Iqbal et al. |
| 6,653,009 B2 | 11/2003 | Wang et al. |
| 6,663,992 B2 | 12/2003 | Lehnert et al. |
| 6,703,155 B2 | 3/2004 | Scartozzi |
| 6,716,549 B2 | 4/2004 | Bai et al. |
| 6,720,105 B2 | 4/2004 | Ohlsen et al. |
| 6,733,913 B2 | 5/2004 | Cisar et al. |
| 6,740,443 B2 | 5/2004 | Yamazaki et al. |
| 6,761,990 B1 | 7/2004 | Yoshitake et al. |
| 6,770,394 B2 | 8/2004 | Appleby et al. |
| 6,805,990 B2 | 10/2004 | Gorbell |
| 6,828,057 B2 | 12/2004 | Ovshinsky et al. |
| 6,828,062 B2 | 12/2004 | Lu et al. |
| 6,838,202 B2 | 1/2005 | Brady et al. |
| 6,838,205 B2 | 1/2005 | Cisar et al. |
| 6,844,101 B2 | 1/2005 | Lee et al. |
| 6,852,437 B2 | 2/2005 | Cisar et al. |
| 6,855,450 B2 | 2/2005 | Molter et al. |
| 6,863,838 B2 | 3/2005 | Hamrock |
| 6,869,720 B2 | 3/2005 | Anderson et al. |
| 6,872,487 B2 | 3/2005 | Karichev |
| 6,887,610 B2 | 5/2005 | Elhamid et al. |
| 6,890,680 B2 | 5/2005 | Beckmann et al. |
| 6,916,572 B2 | 7/2005 | Lundsgaard et al. |
| 6,939,636 B2 | 9/2005 | Fuglevand et al. |
| 6,942,941 B2 | 9/2005 | Blunk et al. |
| 6,951,698 B2 | 10/2005 | King |
| 6,955,862 B2 | 10/2005 | Hartnack et al. |
| 6,960,404 B2 | 11/2005 | Goebel |
| 6,972,162 B2 | 12/2005 | Gao et al. |
| 6,974,648 B2 | 12/2005 | Goebel |
| 6,989,216 B2 | 1/2006 | Puttaiah et al. |
| 7,001,687 B1 | 2/2006 | Gaines et al. |
| 7,005,209 B1 | 2/2006 | Gaines et al. |
| 7,014,947 B2 | 3/2006 | Speranza et al. |
| 7,071,121 B2 | 7/2006 | Punsalan et al. |
| 7,087,327 B2 | 8/2006 | Pearson |
| 7,157,177 B2 | 1/2007 | Chan |
| 7,160,642 B2 | 1/2007 | Tarver et al. |
| 7,195,836 B2 | 3/2007 | Lisi et al. |
| 7,205,057 B2 | 4/2007 | McLean |
| 7,205,062 B2 | 4/2007 | Tawfik et al. |
| 7,214,442 B2 | 5/2007 | Ramsey et al. |
| 7,270,906 B2 | 9/2007 | Haltiner, Jr. et al. |
| 7,294,425 B2 | 11/2007 | Hodge et al. |
| 7,297,428 B2 | 11/2007 | Saulsbury et al. |
| 7,309,535 B2 | 12/2007 | Ovshinsky et al. |
| 7,309,539 B2 | 12/2007 | Kato et al. |
| 2002/0045085 A1 | 4/2002 | Formato et al. |
| 2002/0177039 A1 | 11/2002 | Lu et al. |
| 2003/0013002 A1* | 1/2003 | Jankowski et al. ............ 429/40 |
| 2003/0035991 A1 | 2/2003 | Colombo et al. |
| 2003/0082431 A1 | 5/2003 | Klitsner et al. |
| 2003/0082434 A1 | 5/2003 | Wang et al. |
| 2003/0087151 A1 | 5/2003 | Hamrock |

| | | |
|---|---|---|
| 2003/0134178 A1 | 7/2003 | Larson |
| 2003/0170521 A1 | 9/2003 | Zhang |
| 2003/0180603 A1 | 9/2003 | Richards |
| 2004/0033414 A1 | 2/2004 | Rohrl |
| 2004/0038105 A1 | 2/2004 | Hennige et al. |
| 2004/0043271 A1 | 3/2004 | Wilkinson et al. |
| 2004/0050713 A1 | 3/2004 | Chuang et al. |
| 2004/0054041 A1 | 3/2004 | Schmidt |
| 2004/0077519 A1 | 4/2004 | Price et al. |
| 2004/0191617 A1 | 9/2004 | Visco et al. |
| 2005/0031925 A1 | 2/2005 | Ofer et al. |
| 2005/0069780 A1 | 3/2005 | Kinouchi et al. |
| 2005/0079403 A1* | 4/2005 | Lipka et al. .......... 429/44 |
| 2005/0084741 A1 | 4/2005 | Leddy et al. |
| 2005/0089733 A1 | 4/2005 | Punsalan et al. |
| 2005/0100662 A1 | 5/2005 | Ohba et al. |
| 2005/0103706 A1 | 5/2005 | Bennett et al. |
| 2005/0106440 A1 | 5/2005 | Komiya |
| 2005/0143517 A1 | 6/2005 | Schmidt |
| 2006/0014068 A1* | 1/2006 | Boysen et al. .......... 429/33 |
| 2006/0134498 A1 | 6/2006 | Hamm et al. |
| 2009/0075149 A1* | 3/2009 | Haile et al. .......... 429/33 |
| 2009/0169939 A1 | 7/2009 | Devries |

FOREIGN PATENT DOCUMENTS

WO  PCT/US2006/39529  10/2006

OTHER PUBLICATIONS

U.S. Appl. No. 11/800,994, filed May 8, 2007, Spink et al.
U.S. Appl. No. 11/801,952, filed May 11, 2007, Fuglevand et al.
U.S. Appl. No. 11/811,624, filed Jun. 11, 2007, Spink et al.

* cited by examiner

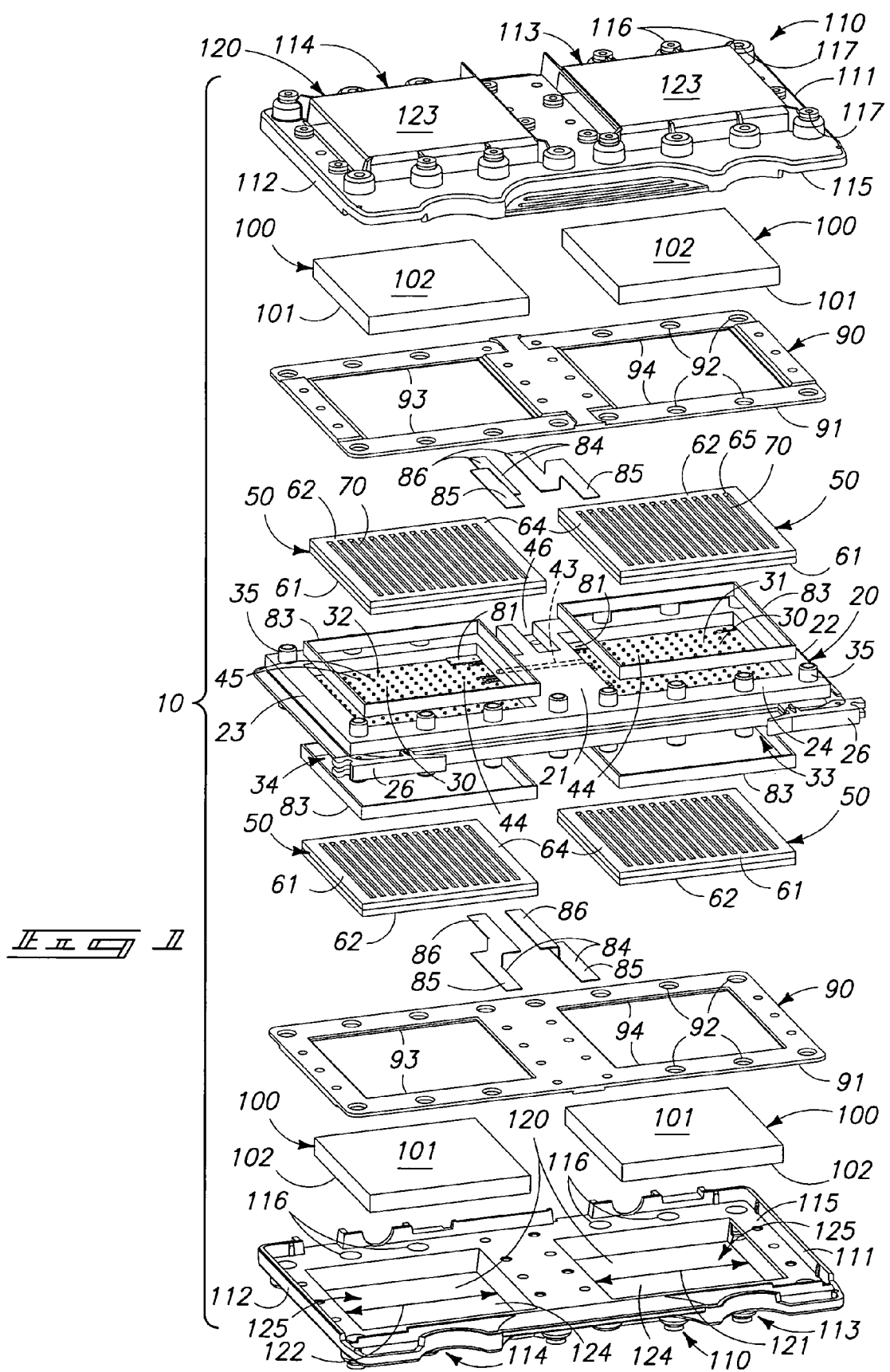
FIG. II

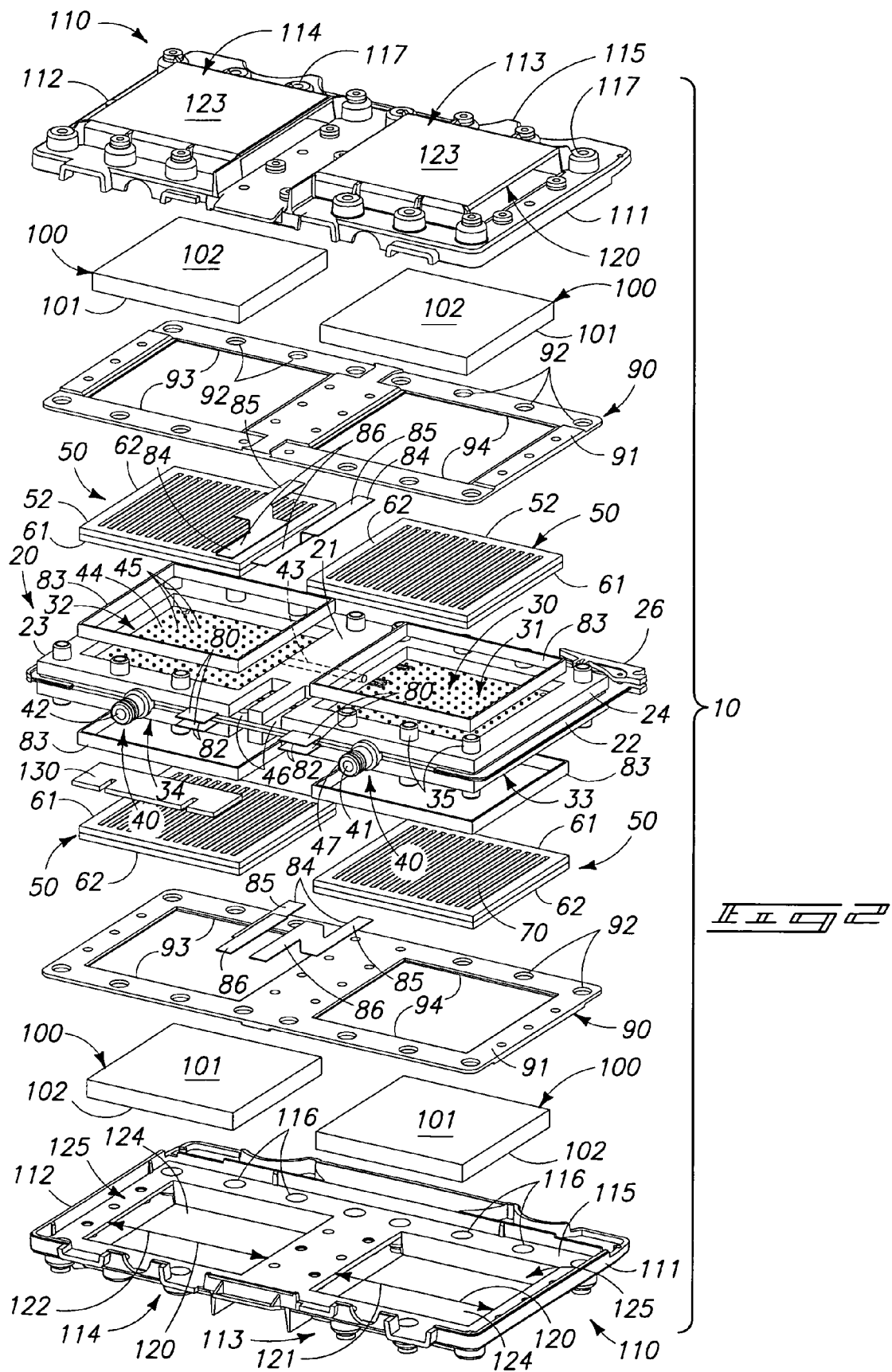

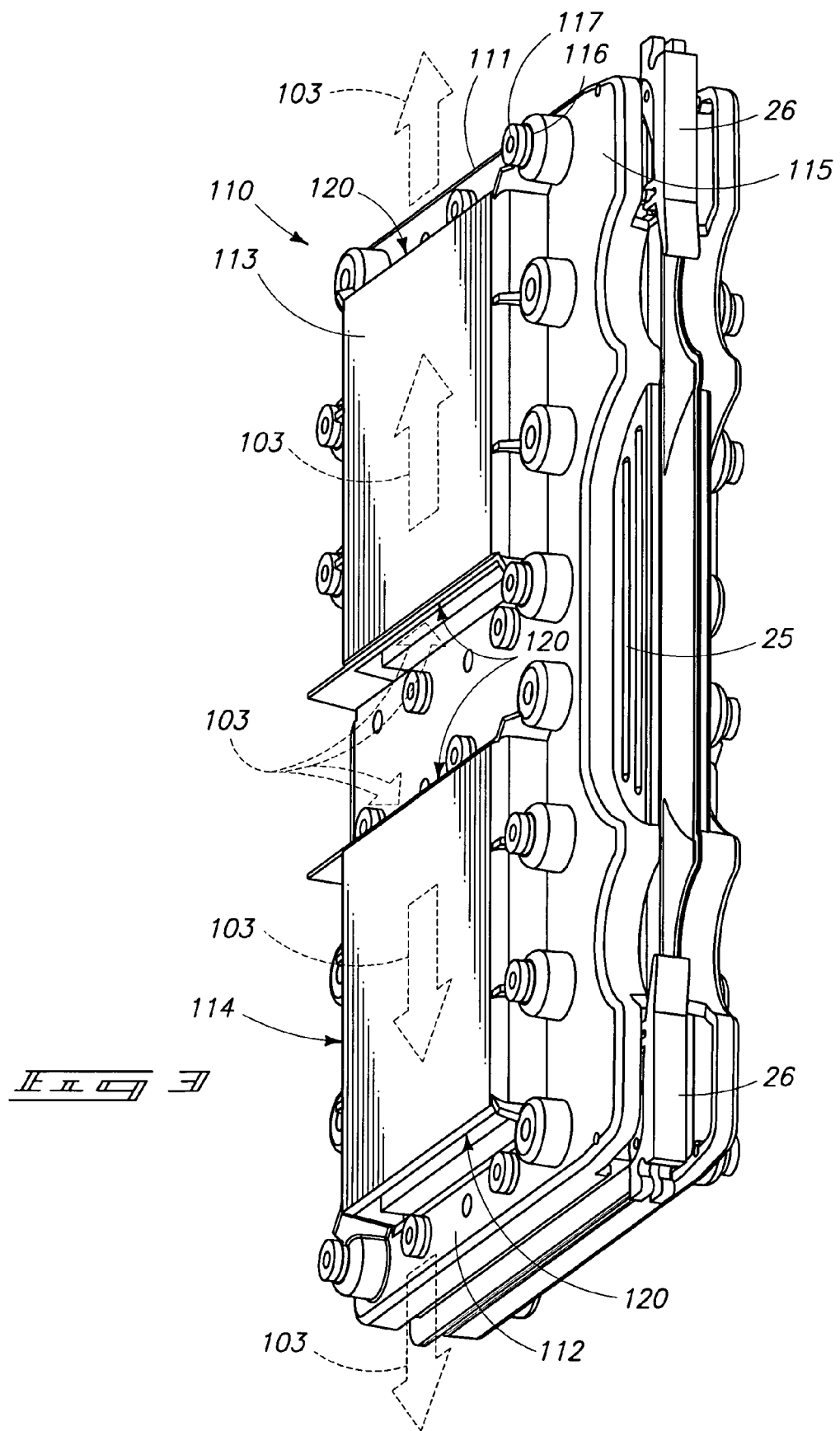

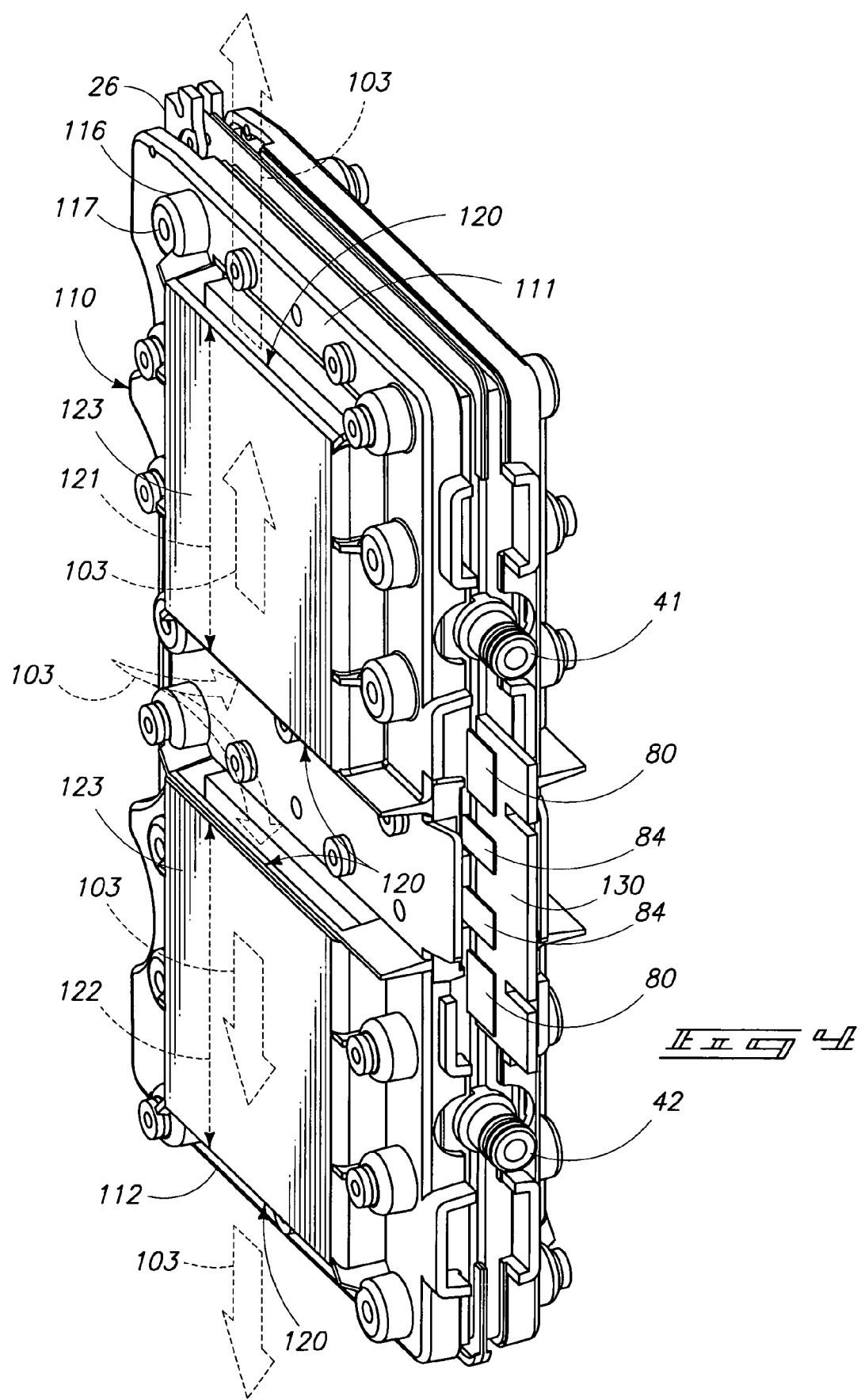

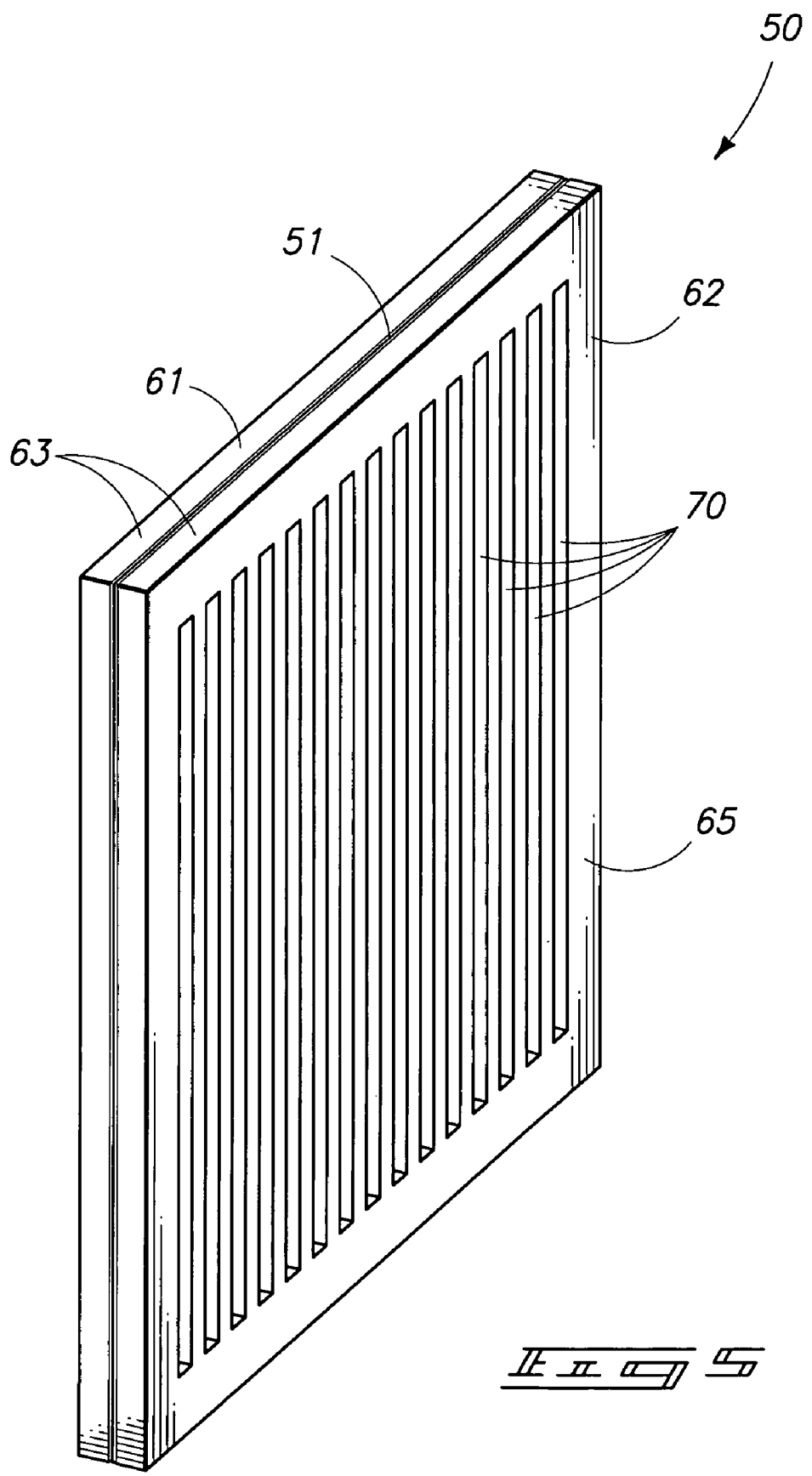

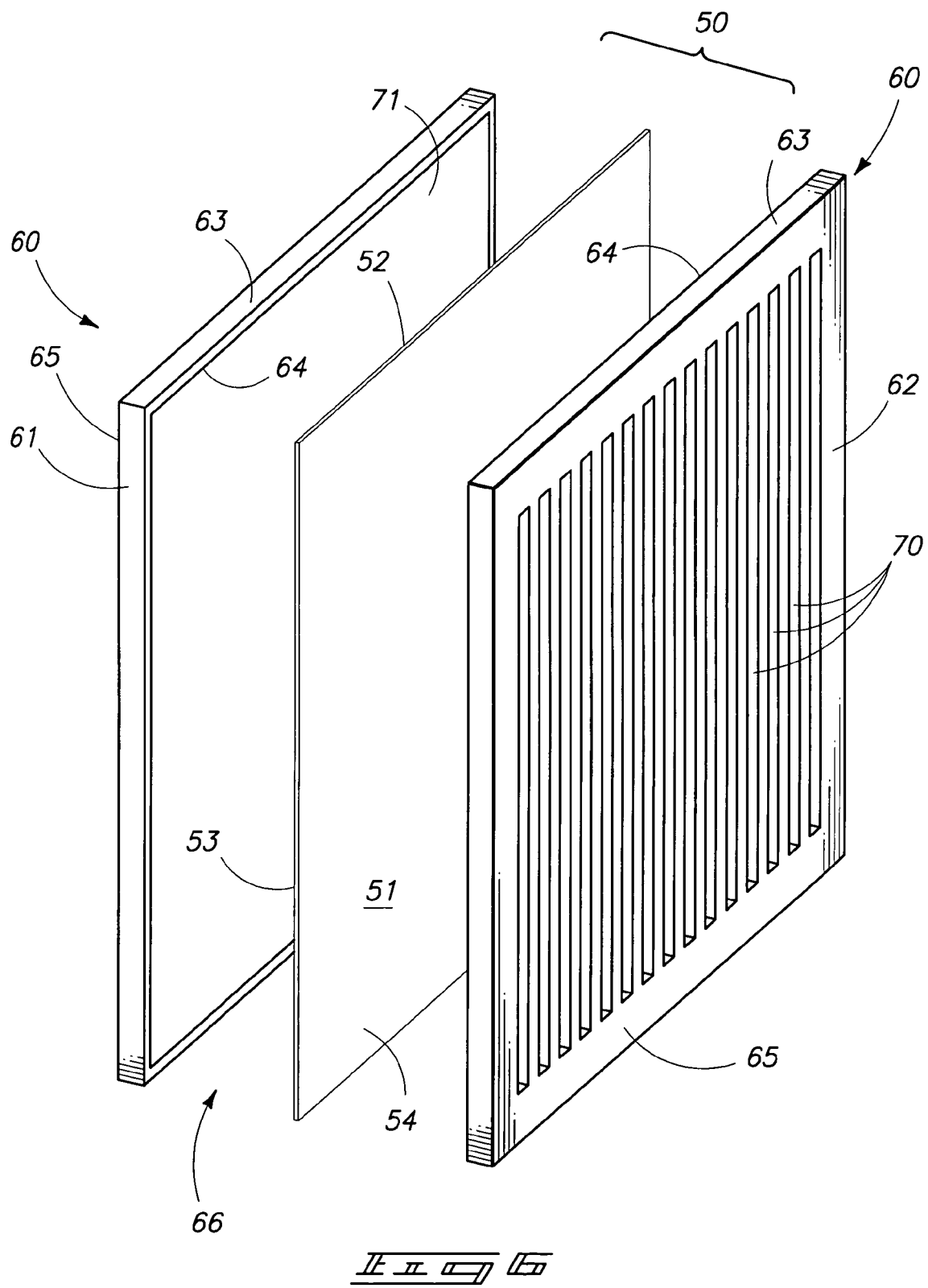

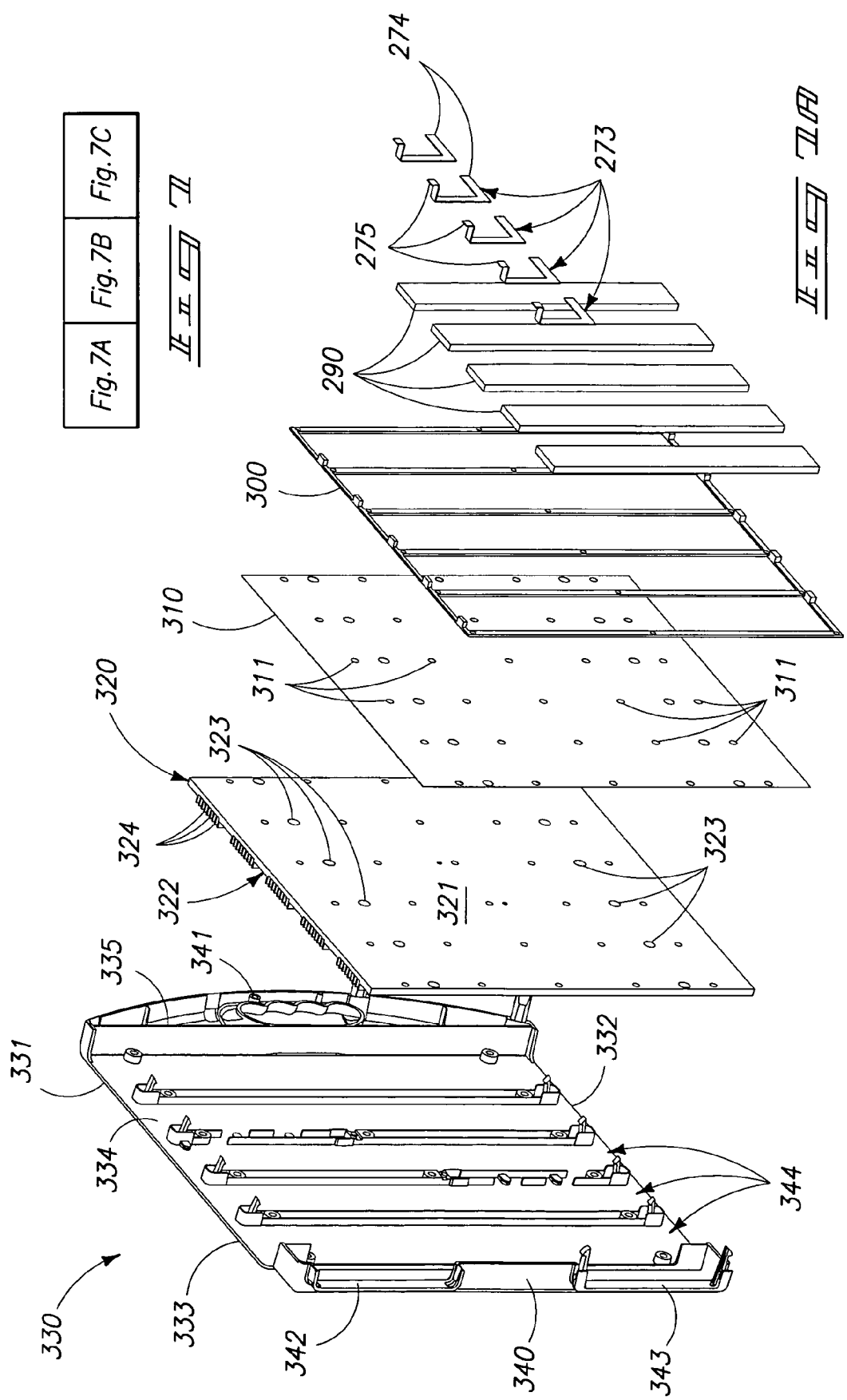

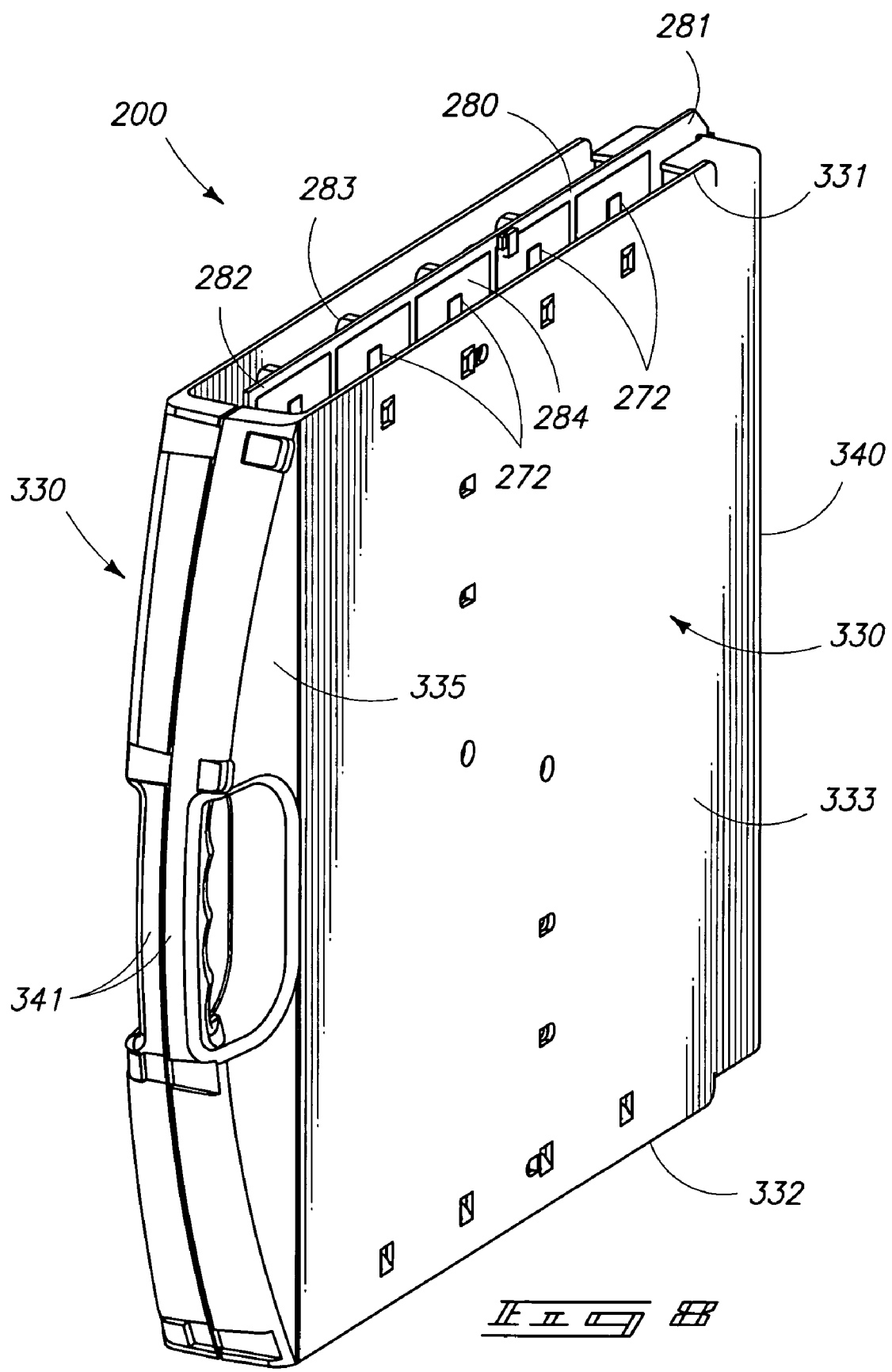

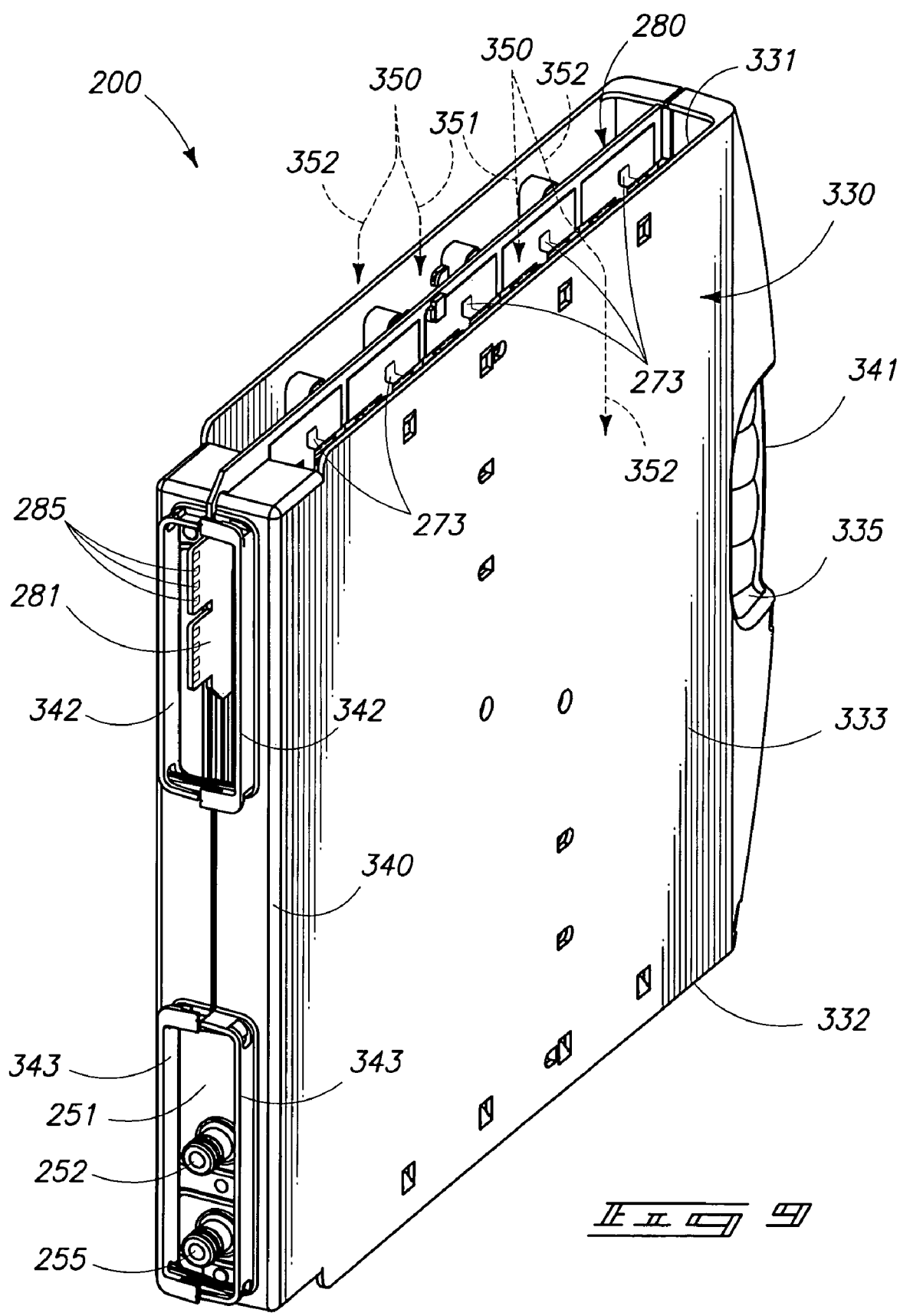

US 7,833,645 B2

PROTON EXCHANGE MEMBRANE FUEL CELL AND METHOD OF FORMING A FUEL CELL

TECHNICAL FIELD

The present invention relates to a proton exchange membrane fuel cell, and a method of forming a fuel cell, and more specifically, to a proton exchange membrane fuel cell which includes electrically conductive ceramic electrodes.

BACKGROUND OF THE INVENTION

U.S. Pat. Nos. 6,030,718 and 6,468,682 relate to proton exchange membrane fuel cells, and more specifically, to fuel cell power systems which include a plurality of discrete fuel cell modules which are self-humidifying, and which offer a degree of reliability, ease of maintenance, and reduced capital costs that have not been possible, heretofore, with respect to previous fuel cells designs which have been primarily directed to stack-type arrangements. The teachings of these earlier patents are incorporated by reference herein.

With respect to fuel cells, in general, their operation are well known. A fuel cell generates electricity from a fuel source, such as hydrogen gas, and an oxidant such as oxygen or air. The chemical reaction does not result in a burning of the fuel to produce heat energy, therefore, the thermodynamic limits on the efficiency of such reactions are much greater than conventional power generation processes. In a proton exchange membrane fuel cell, the fuel gas, (typically hydrogen), is ionized in one electrode, and the hydrogen ion or proton diffuses across an ion conducting membrane to recombine with oxygen ions on the cathode side. The byproduct of the reaction is water and the production of an electrical current.

While the modular PEM fuel cells disclosed in the patents, referenced above, have operated with a great deal of success, there have been shortcomings which have detracted from their usefulness. Chief among the difficulties encountered in the commercial introduction of the fuel cells as seen in U.S. Pat. Nos. 6,030,718 and 6,468,682 is the multiplicity of parts required to fabricate and produce same. In particular, and as seen in U.S. Pat. No. 6,030,718, this particular patent shows an array of parts Which are utilized to transmit force substantially uniformly from the cathode covers of the respective PEM fuel cell modules to the underlying current collector which is pressed into ohmic electrical contact with the opposite anode and cathode sides of an ion exchange membrane. Again in U.S. Pat. No. 6,468,682, the fuel cell design as shown therein includes an array of rather sophisticated force application springs which lie in force transmitting relation relative to an underlying current collector which is forced by these same springs into ohmic electrical contact relative to the ion exchange membrane.

As should be understood from the teachings of these two patents, the costs attendant with the fabrication of these rather sophisticated parts, and the time required for assembly for these PEM fuel cell modules is significant. Moreover, manufacturing variations which may occur from time-to-time in these parts may result in decreased performance of the individual ion exchange membranes which are incorporated within these individual PEM fuel cell modules. In addition to the shortcomings noted above, difficulties have arisen from time-to-time regarding the operation of the PEM fuel cell modules in high temperature environments.

Accordingly, a proton exchange membrane fuel cell, and method of forming a fuel cell which achieves the benefits to be derived from the aforementioned technology, but which avoids the detriments individually associated with these novel PEM fuel cell modules, and stack-type fuel cells is the subject matter of the present invention.

SUMMARY OF THE INVENTION

A first aspect of the present invention is to provide a proton exchange membrane fuel cell having opposite anode and cathode sides; and individual electrodes juxtaposed relative to each of the anode and cathode sides, and wherein at least one of the electrodes is fabricated, at least in part, of a porous, electrically conductive ceramic material.

Another aspect of the present invention is to provide an electrode for use in a proton exchange membrane fuel cell, and which has a proton exchange membrane, and which further includes a porous electrically conductive ceramic substrate which is disposed in ohmic electrical contact with the proton exchange membrane, and which simultaneously acts as a heat sink, gas diffusion layer, and as a current collector; and a catalyst layer is applied to the porous electrically conductive ceramic substrate.

Still another aspect of the present invention relates to a proton exchange membrane fuel cell module which includes a module housing defining a cavity, and wherein the cavity is coupled in fluid flowing relation relative to a source of air, and a source of a fuel gas; a polymeric proton exchange membrane positioned within the cavity of the module housing, and wherein the polymeric proton exchange membrane has an anode and an opposite cathode side, and wherein the source of air is supplied to the cathode side of the polymeric proton exchange membrane, and the source of the fuel gas is supplied to the anode side of the polymeric proton exchange membrane; a catalyst coating positioned in juxtaposed relation relative to each of the anode and cathode sides of the polymeric proton exchange membrane; and a porous ceramic electrically conductive substrate positioned in covering relation relative to the catalyst coating which is located on the anode and cathode sides of the polymeric proton exchange membrane, and which is further positioned in ohmic electrical contact with each of the anode and cathode sides of the polymeric proton exchange membrane, and wherein the catalyst layer and the porous ceramic electrically conductive substrate form a ceramic gas diffusion electrode for each of the anode and cathode sides of the polymeric proton exchange membrane.

Yet another aspect of the present invention relates to a method of forming a fuel cell which includes the steps of providing a pair of porous electrically conductive ceramic substrates having inside and outside facing surfaces, and positioning the pair of porous electrically conductive ceramic substrates in spaced relation, one relative to the other; applying a catalyst coating to the inside facing surface of each of the porous electrically conductive ceramic substrates; and providing a polymeric proton exchange membrane having opposite anode and cathode sides, and positioning the polymeric proton exchange membrane therebetween, and in ohmic electrical contact relative to, each of the porous electrically conductive ceramic substrates to form the fuel cell.

These and other aspect of the present invention will be described in greater detail hereinafter.

BRIEF DESCRIPTION OF THE DRAWINGS

Preferred embodiments of the invention are described below with reference to the following accompanying drawings.

FIG. 1 is a perspective, exploded side elevation view of a first form of the present invention.

FIG. 2 is a second, perspective, exploded side elevation view of a first form of the present invention, and which is taken from a position which is opposite to that seen in FIG. 1.

FIG. 3 is a perspective, side elevation view of the first form of the invention and which is shown in an assembled configuration.

FIG. 4 is a perspective, side elevation view of the first form of the invention and which is taken from a position opposite to that seen in FIG. 3.

FIG. 5 is a perspective, fragmentary, side elevation view of a membrane electrode assembly which forms a part of the present invention.

FIG. 6 is a perspective, fragmentary, exploded view of the membrane electrode assembly as seen in FIG. 5.

FIGS. 7A, 7B and 7C are perspective exploded side elevation views of a second form of the present invention.

FIG. 8 is a perspective, side elevation view of the second form of the present invention, and which is shown in an assembled configuration.

FIG. 9 is a perspective, side elevation view of the second form of the present invention, and which is taken from a position opposite to that seen in FIG. 8.

DETAILED DESCRIPTION OF THE PREFERRED EMBODIMENTS

Figure 11B:
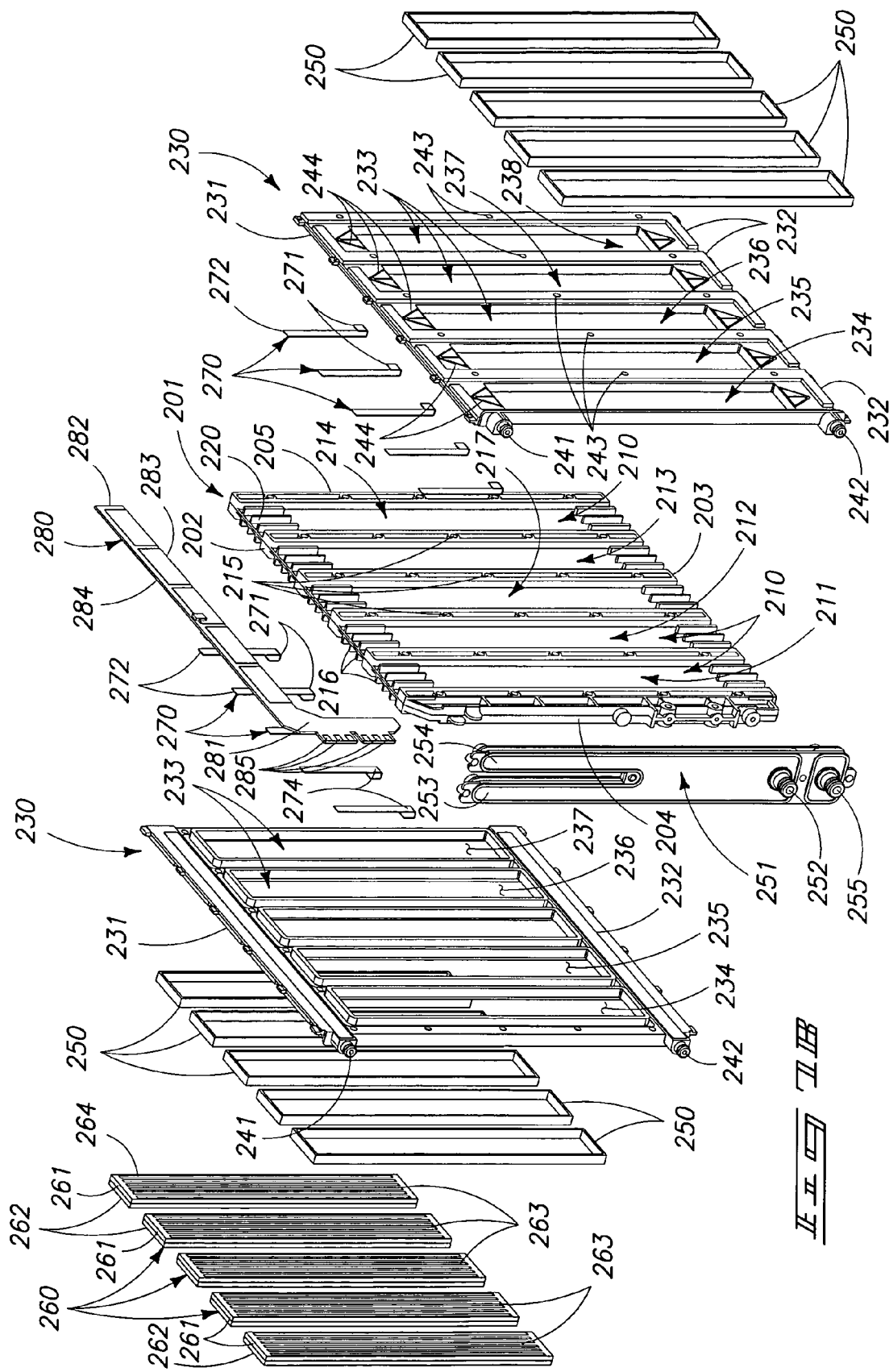

This disclosure of the invention is submitted in furtherance of the constitutional purposes of the U.S. Patent Laws "to promote the progress of science and useful arts" (Article 1, Section 8).

First Form

Referring more particularly to the drawings, the first form of the proton exchange membrane fuel cell, and method of forming a fuel cell is generally indicated by the numeral 10 in FIG. 1. A proton exchange membrane fuel cell module 10, hereinafter referred to as a "PEM fuel cell module," includes two forms of the invention as will be described below. The first form of the invention 10 as seen in FIGS. 1-4 includes many structures and assemblies very similar to that seen in U.S. Pat. No. 6,030,718; the teachings of which are incorporated by reference herein. In this regard, the PEM fuel cell module 10 of the present invention includes a hydrogen distribution frame 20 which is fabricated from a substrate which typically has a flexural modules of less than about 500,000 PSI and a compressive strength of typically less than about 20,000 PSI. As such, a number of suitable or equivalent thermoplastic materials can be utilized. The hydrogen distribution frame 20 includes a main body 21 as seen in FIGS. 1-4. The main body has a first end 22 and an opposite second end 23. Further, the main body is defined by a peripheral edge 24. In an assembled configuration, a handle 25 which facilitates the convenient manual manipulation of the PEM fuel cell module 10 is positioned along the peripheral edge (FIG. 3). As seen in FIGS. 1 and 2, the PEM fuel cell module includes a cartridge latch which is generally indicated by the numeral 26 and which is pivotally affixed along the peripheral edge 24, and which allows the PEM fuel cell module 10 to be conveniently coupled with a fuel cell power system (not shown), but which was discussed in significant detail in U.S. Pat. No. 6,030,718.

As seen in FIGS. 1-4, the main body 21 defines a plurality of substantially opposed cavities 30. These cavities are designated first, second, third and fourth cavities 31, 32, 33, and 34, respectively. Still further, and referring again to FIGS. 1 and 2, a plurality of apertures 35 are formed, in given locations, in the main body 21 and are operable to receive fasteners which will be described in greater detail hereinafter. The main body 21 further defines a pair of passageways designated generally by the numeral 40 (FIG. 2). The pair of passageways include a first passageway 41 which permits the delivery of hydrogen gas, from a source of same, to each of the cavities 31-34; and a second passageway 42 which facilitates the removal of impurities, water and unreacted hydrogen gas from each of the cavities 31-34, respectively. A linking passageway 43, shown in phantom lines in FIGS. 1 and 2, operably fluidly couples each of the respective first and second cavities 31 and 32, respectively; and the third and fourth cavities 33 and 34, respectively in fluid flowing relation one relative to the other such that hydrogen gas delivered by means of the first passageway 41 may find its way into each of the cavities 31-34, respectively. Each of the cavities 31-34 are substantially identical in their overall dimensions and shape. Still further, each cavity defines a region 44 which supports a proton exchange membrane having individual porous ceramic electrodes as will be described in greater detail hereinafter. Positioned in each of the given regions 44 of the respective cavities 30, and extending substantially normally, outwardly therefore are a plurality of small projections 45. The small projections elevate or space a proton exchange membrane or cell assembly from the hydrogen distribution frame so that a fuel gas, like hydrogen, can reach or otherwise be supplied uniformly to the anode side of the proton exchange membrane. This will be discussed in greater detail hereinafter.

As seen in FIGS. 1-4, the first and second passageways 41 and 42 are connected in fluid flowing relation relative to each of the regions 44. As seen in FIGS. 1-4, the peripheral edge 24 defines a number of gaps or openings 46. Referring now to FIG. 2, the first and second passageways 41 and 42 each have a terminal end 47 which has a given outside diametral dimension. The terminal end of each of the passageways is operable to matingly couple in fluid flowing relation relative to a fluid manifold which is typically made integral with a fuel cell power system which is more fully described in U.S. Pat. No. 6,030,718.

Referring now to FIG. 5, the proton exchange membrane fuel cell module 10 includes a plurality of integral membrane electrode assemblies (MEA) 50 which are individually received in the regions 44 of the respective first, second, third and fourth cavities 31-34, respectively. The MEA 50 which is of novel construction and which is distinguishable from that as taught in U.S. Pat. No. 6,030,718, and others, includes a solid polymeric proton exchange membrane which is generally indicated by the numeral 51. The solid polymeric proton exchange membrane 51 is defined by a peripheral edge 52, and further has an anode side 53, and an opposite cathode side 54 (FIG. 6). In the construction as seen in the drawings, it should be understood that the solid polymeric proton exchange membrane 51 is made integral with a porous electrically insulative substrate which has opposite sides. The purpose of the porous electrically insulative substrate will be discussed in greater detail hereinafter with respect to the methodology for forming a fuel cell in accordance with the present invention. The solid polymeric proton exchange membrane 50 operates in a fashion similar to that disclosed in the earlier U.S. patents, and may be purchased from commercial sources under the trade name NAFION™.

With respect to the solid polymeric proton exchange membrane 50, it is well known that the structure of the polymeric proton exchange membrane is such that the polymeric proton exchange membrane 50 has relatively small internal voids formed in same (not shown). In the arrangement as seen in FIGS. 1-4, it should be understood that the solid polymeric proton exchange membrane 51 may further include or incorporate therein an ionic liquid which fills at least some of the internal voids of the polymeric proton exchange membrane. In this regard, ionic fluids such as those disclosed in U.S. Pat. Nos. 5,827,602 and 6,531,241 are acceptable for this purpose. The ionic liquid may comprise a hydrophobic ionic liquid having a cation and anion, and wherein the cation is selected from the group comprising Pyridinium; Pyridazinium; Pyrimidinium; Pyrazinium; Imidazolium; Pyrazolium; Thiazolium; Oxazolium; and Triazolium; and the anion is a non-Lewis acid containing a polyatomic anion having a van der Waals volume exceeding 100 cubic angstroms. Yet in another form, the ionic liquid may comprise a salt having two or more delocalized cations being separated by spacer groups, and wherein the cations are selected from the group comprising Pyridinium; Pyridazinium; Pyrimidinium; Pyrazinium; Imidazolium; Pyrazolium; Thiazolium; Oxazolium; and Triazolium; and wherein the salt also comprises anions in appropriate number to maintain the charge neutrality, and wherein the anion is a polyatomic anion having a van der Waals volume exceeding 100 cubic angstroms. The teachings of U.S. Pat. No. 5,827,602 and U.S. Pat. No. 6,531,241 are incorporated by reference herein. In the methodology as will be described hereinafter, the solid polymeric proton exchange membrane may be fabricated in a fashion whereby the anode and cathode sides thereof 53 and 54 substantially conform to the surface topology of the adjacent anode and cathode electrodes which will be described in greater detail below. As should be understood, in some forms of the invention, a plurality of ionic fluids may fill at least some of the internal voids of the polymeric proton exchange membrane 51 to give enhanced performance to same. Various techniques such as dispersion casting are contemplated for use in this aspect of the invention.

Referring now to FIGS. 5 and 6, the proton exchange membrane fuel cell module 10 as seen in FIG. 1, includes, as described above, a proton exchange membrane 51 having opposite anode and cathode sides 53 and 54, respectively; and a pair of porous ceramic electrodes which are individually positioned in juxtaposed relation relative to each of the anode and cathode sides. The pair of porous ceramic electrodes includes a first anode electrode 61, and an opposite cathode electrode 62. The respective porous ceramic electrodes 61 and 62 are disposed, at least in part, in ohmic electrical contact with the respective anode and cathode sides 53 and 54 of the solid polymeric proton exchange membrane 51. Each of the anode and cathode electrodes 61 and 62 has a main body 63 which is formed, at least in part, of a porous electrically conductive ceramic material substrate which comprises a group IVB-VIB transition metal diboride which is thermally conductive. More specifically, the main body 63 is formed, at least in part, of a porous electrically conductive ceramic material which is selected from the group comprising titanium diboride, and zirconium diboride. With respect to the pair of electrodes 60, the main body 63 of the individual electrodes 61 and 62 has an electrical resistivity of less than about 60 micro-ohm-centimeter. Still further, the main body 63 is fabricated from a porous electrically conductive ceramic material which has a gaseous porosity of greater than about 1 to about 1,000 Gurley seconds. Each of the respective electrodes 61 and 62 has an inside facing surface 64, and an opposite outside facing surface 65. As seen in FIG. 6, and during the assembly process, a gap 66 is defined between the inside facing surface 64 of the respective anode and cathode electrodes 61 and 62, respectively. During assembly, and as will be discussed in greater detail hereinafter, the solid polymeric proton exchange membrane 51 is positioned therebetween, and then made integral therewith each of the electrodes 61 and 62 using the methodology as will be described below.

As seen in FIG. 6, the outside facing surface 65 of the respective electrodes 61 and 62 has a plurality of channels 70 formed therein. As should be understood, the porous electrically conductive ceramic material substrate forming the main body 63 of each of the anode and cathode electrodes 61 and 62 is formed of a porous electrically conductive ceramic material which is thermally conductive, and which acts as a heat sink, and further acts to control the rate of gas diffusion. When assembled, and rendered operational, the proton exchange membrane fuel cell 10 produces heat energy, and water as a byproduct. The thermally conductive nature of the porous electrically conductive ceramic material is of such a nature that it removes a preponderance of the heat energy generated by the proton exchange membrane fuel cell module 10 during fuel cell operation. Still further, the porous electrically conductive ceramic material substrate forming the main body 63 of each of the electrodes retains an amount of water produced during PEM fuel cell module 10 operation to render the proton exchange membrane fuel cell substantially self-humidifying. Additionally, because of the nature of the porous electrically conductive ceramic main body 63, this same structure simultaneously acts as an electrical current collector for the proton exchange membrane fuel cell module 10. This feature of the present invention 10 substantially eliminates structures such as the current collector 190 as seen in FIG. 28 of U.S. Pat. No. 6,030,718, the teachings of which are incorporated by reference herein. This aspect of the present invention further makes the apparatus 10 easier to fabricate, and simpler in design than that which is taught in this earlier reference. In this regard, and in the present invention, the PEM fuel cell module 10, when rendered operational, has an optimal electrical power output, and wherein the optimal electrical power output is achieved without the application of appreciable external force being supplied to the anode and cathode electrodes 61 and 62, respectively. This feature of the invention eliminates the structures as seen at numerals 202, 203 and 221, respectively in U.S. Pat. No. 6,030,718. As should be understood, these structures in the previous U.S. patent were designed to transmit force substantially evenly to the current collector 190 thereby maintaining the current collector in effective ohmic electrical contact with the respective anode and cathode sides of the membrane electrode diffusion assembly. The current invention 10 through the methodology of manufacturing, as will be described below, completely eliminates the need for these structures, thereby rendering the present invention much more useful and easier to manufacture and having a further enhanced degree of reliability.

With respect to the ceramic anode and cathode electrodes as described herein, it should be understood from the discussion, above, that the respective electrically conductive ceramic material substrate forming the main body 63, thereof, has an individual pore size which increases the oxygen entrainment in the liquid water which is generated during PEM fuel cell module 10 operation. Still further, the porosity of the same porous electrically conductive ceramic material substrate retains, and disperses, sufficient liquid water so as to render the proton exchange membrane fuel cell 10 substantially self-humidifying. In the arrangement as seen in FIG. 5, the main body 63 which is formed of the porous electrically conductive ceramic material has a pore size of about 5 to about 200 microns, and a thickness of less than about 10 mm.

As should be understood, the channels 70 which are formed in the outside facing surface 65, increase the surface of same and therefore provides a means for effectively dissipating heat energy which is generated during PEM fuel cell module 10 operation as will be described below. Further, these same structures control, to some degree, the gas diffusion rate of the electrodes. Still further, and as seen in FIG. 6, a thin catalyst layer 71 is formed or deposited on the inside facing surface 64 of each of the first and second electrodes 61 and 62, respectively. The catalyst layer 71 is selected from the group comprising platinum black, platinum-on-carbon, and/or a composite noble metal material. When fully assembled (FIG. 5), the catalyst layer or coating 71 (FIG. 6) is positioned in juxtaposed relation relative to each of the anode and cathode side 53 and 54 of the solid polymeric proton exchange membrane 51. As will be discussed in greater detail hereinafter, the methodology for forming a fuel cell includes steps which provide conditions that are effective for the catalyst layer or coating 71 to substantially conform to the surface topology of the inside facing surfaces 64 of the respective anode and cathode electrodes 61 and 62, respectively. In this regard, the catalyst coating penetrates a distance into the pores of the inside facing surface of each of the porous electrically conductive ceramic substrates forming the main body 63 of the respective electrodes 60.

As should be understood, the membrane electrode assembly 50 is a single, integral structure, and which is fully operational when supplied with a source of a fuel gas, and air, to produce an electrical output without the need of applying external force or mechanical force application assemblies of any type to same.

The present invention 10 also relates to a method of forming a fuel cell which includes in its broadest aspect, a first step of providing a pair of porous electrically conductive ceramic substrates such as 63, and which have inside and outside facing surfaces 64 and 65; and positioning the pair of porous electrically conductive ceramic substrates in spaced, relation one relative to the other. This is seen most clearly by reference to FIG. 6. The methodology of the present invention includes another step of applying a catalyst coating or layer 71 to the inside facing surface 64 of each of the porous electrically conductive ceramic substrates 63. Still further, the method includes another step of providing a polymeric proton exchange membrane 51 having opposite anode and cathode sides 53 and 54; and positioning the polymeric proton exchange membrane therebetween, and in ohmic electrical contact relative to each of the porous electrically conductive ceramic substrates to form the fuel cell (FIG. 5). As noted above, the porous electrically conductive ceramic substrates 63, as seen in FIG. 6, have a pore size of about 5 to about 200 Microns, and a surface topology, and wherein the step of applying the catalyst coating or layer 71 further includes the step of providing conditions which are effective for the catalyst coating 71 to substantially conform to the surface topology, and penetrate a distance into the pores of the inside facing surface of each of the porous electrically conductive ceramic substrates 63. As briefly discussed above, and during assembly of the MEA 50, a gap 66 is defined between the inside facing surfaces 64 of the respective porous electrically conductive ceramic substrates 63, and the method includes another step of providing the polymeric proton exchange membrane 51, and further supplying and containing within the gap 66 a fluid, polymeric, proton conducting dispersion; and providing conditions which are effective to convert the fluid, polymeric proton conducting dispersion into a solid polymeric proton exchange membrane 51 having anode and cathode sides 53, and 54, and which substantially conforms to the surface topology of the respective inside facing surfaces 64 of each of the porous electrically conductive ceramic substrates 63.

In the method of the present invention the MEA 50 may also be formed by the methodology as described below. In this regard, a gap 66 is defined between the inside facing surfaces 64 of the respective porous electrically conductive ceramic substrates 63, and wherein the step of providing the polymeric proton exchange membrane 51 further comprises a step of providing a polymeric proton exchange membrane 51 having opposite sides; applying a coating of a fluid, polymeric proton conducting dispersion, which is compatible with the polymeric proton exchange membrane 51, on each of the opposite sides of the polymeric proton exchange membrane; and providing conditions which are effective to convert the fluid, polymeric proton conducting dispersion into a portion of the polymeric proton exchange membrane 50. During the step of providing these conditions, the porous electrically conductive ceramic substrates 63 are each placed into contact with the solid polymeric proton exchange membrane 51, and the conditions which are provided are such that the fluid polymeric proton conducting dispersion substantially conforms to the surface topology of the respective inside facing surfaces 64 of each of the porous electrically conductive ceramic substrates 63 to form the resulting membrane electrode assembly 50. These conditions which are effective to convert the fluid polymeric proton conducting dispersion into a portion of the polymeric proton exchange membrane may include, among others, heating the assembly so as to convert the fluid polymeric proton conducting dispersion into a solid.

In the methodology of fabricating a fuel cell as seen in the present invention, another approach to the manufacture or fabrication of an appropriate membrane electrode assembly 50 includes the steps as set forth below. As earlier described, a gap 66 is defined between the inside facing surfaces 64 of the respective porous electrically conductive ceramic substrates 63, and wherein the step of providing the polymeric proton exchange membrane 50 further includes the step of providing a porous electrically insulative substrate and which has opposite sides (not shown); and providing a fluid, polymeric, proton conducting dispersion, and incorporating the fluid polymeric proton conducting dispersion into the porous electrically insulative substrate. In this regard, the porous electrically insulative substrate may include such substrates as cellulosic substrates, plastic substrates, and other dielectric materials which can incorporate the fluid polymeric proton conducting dispersion therein. In the methodology as described above, the method may include a further step of after the step of providing the fluid polymeric proton conducting dispersion, positioning the electrically insulative substrate incorporating the fluid polymeric proton conducting dispersion in the gap 66 which is defined therebetween the pair of porous ceramic electrically conductive substrates 63. The method includes another step of individually positioning the respective porous ceramic electrically conductive substrates 63 into physical contact with the opposite sides of the porous electrically insulative substrate to provide a resulting assembly; and providing temperature conditions which are effective to change the fluid polymeric proton conducting dispersion into a solid polymeric proton exchange membrane 50 which is disposed in ohmic electrical contact with each of the porous ceramic electrically conductive substrates 63 to form the membrane electrode assembly 50 as seen in FIGS. 6 and 7.

In the methodology as described, above, for fabricating the membrane electrode assembly 50, the methodology may include additional steps. As earlier described, the polymeric proton exchange membrane 51 typically has a plurality of internal voids, and the methodology as described further includes a step of providing an ionic liquid, and filling at least some of the internal voids of the polymeric proton exchange membrane 51 with the ionic liquid. In the present methodology, the ionic liquid may include a plurality of ionic fluids. In this regard, and In the methodology as described above, the ionic liquid may comprise a hydrophobic ionic liquid having a cation and anion, and wherein the cation is selected from the group comprising Pyridinium; Pyridazinium; Pyrimidinium; Pyrazinium; Imidazolium; Pyrazolium; Thiazolium; Oxazolium; and Triazolium; and the anion is a non-Lewis acid containing a polyatomic anion having a van der Waals volume exceeding 100 cubic angstroms. Still further, and in the methodology as described above, the ionic liquid may also comprise a salt having two or more delocalized cations being separated by spacer groups, and wherein the cations are selected from the group comprising Pyridinium; Pyridazinium; Pyrimidinium; Pyrazinium; Imidazolium; Pyrazolium; Thiazolium; Oxazolium; and Triazolium; and wherein the salt also comprises anions in appropriate number to maintain the charge neutrality, and wherein the anion is a polyatomic anion having a van der Waals volume exceeding 100 cubic angstroms. In the methodology as described above, the porous ceramic electrically conductive substrates 63 may be each fabricated from titanium diboride and/or zirconium diboride as will be described below.

In the methodology for forming a fuel cell, the method includes steps for the fabrication of a suitable electrically conductive ceramic material substrate 63. In this regard, the step of providing the pair of porous ceramic electrically conductive substrates 63 further includes the steps of providing a source of electrically conductive ceramic particles having a predetermined size; and providing a fixture (not shown) defining a cavity; and depositing the source of electrically conductive ceramic particles to a predetermined depth within the fixture. Thereafter, the method includes a step of applying pressure to the electrically conductive ceramic particles within the cavity to achieve a given porosity; and sintering the ceramic particles to produce the resulting porous electrically conductive ceramic substrates 63. As should be understood, binders and other materials may be mixed with the source of electrically conductive ceramic particles, and may thereafter be eliminated from the ceramic substrates by the step of sintering. In the present methodology, the electrically conductive ceramic particles have a size of about 4 to about 35 microns, and the resulting porous electrically conductive ceramic substrates 35 each have a gaseous porosity of about 1 to about 1,000 Gurley seconds. In the methodology of the present invention, the fixture comprises a mold, and the resulting electrically conductive ceramic materials may be formed into planer sheets as shown in FIGS. 5 and 6, or further may be formed into other different shapes. In the present methodology, the resulting porous electrically conductive ceramic substrates typically have a thickness of less that about 10 mm.

Referring back to FIGS. 1 and 2 which shows an exploded, perspective view of the first form of the fuel cell module 10 of the present invention, it will be seen in FIG. 2 that the fuel cell module 10 includes individual anode current tabs which are generally indicated by the numeral 80 and which have a first end 81 (FIG. 1) which is positioned within the region 44 and in the first, second, third and fourth cavities 31, 32, 33 and 34, respectively. The respective anode current tabs are sealably coupled to the hydrogen distribution frame 20. Each anode current tab has an opposite second end 82 (FIG. 2) which can then be electrically coupled to an electrical bus (not shown).

During operation, electricity generated by the MEA 50 is transmitted by way of the respective anode current tabs 80 to a suitable electrical bus such as might be incorporated in a fuel cell power system as more fully disclosed in such patents as U.S. Pat. Nos. 6,030,718 and 6,468,682, the teachings of which are incorporated by reference herein. As seen in the drawings, the MEA 50, as seen in FIG. 5, is received within each of the opposed cavities 31, 32, 33 and 34, respectively. As should be understood, in this arrangement, the anode side 53 of the solid polymeric proton exchange membranes 51 are proximately related (one relative to the other) when received in the respective cavities 31-34, and the cathode sides 54 are distally related. Positioned about the peripheral edge of each of the MEA's 50 is an anode perimeter seal 83. The anode perimeter seal is designed and arranged so as to prevent the fuel gas supplied to the anode side 53 of the membrane electrode assembly 50 from leaking away from the anode side 53. Still further, and as seen in the exploded views of FIGS. 1 and 2, the proton exchange membrane fuel cell module 10 of the first form of the invention further includes individual cathode current tabs 84 which are placed into ohmic electrical contact with the cathode side 54 of the solid polymeric proton exchange membrane 51. As seen in the drawings, the cathode current tabs have a first portion 85 which rests in ohmic electrical contact thereagainst the outside facing surface 65 of the porous electrically conductive ceramic substrate 63 forming the electrode which is positioned on the cathode side 53 of the solid, polymeric, proton exchange membrane 52. Still further, each of the cathode current tabs have an opposite, second or distal end 86 which can be coupled to a suitable electrical bus which might be incorporated into a fuel cell power system as described in the aforementioned prior art patents.

As discussed briefly above, and in the arrangements as seen in FIGS. 1-6, for example, the PEM fuel cell module 10, when rendered operational, has an optimal electrical power output, and wherein the optimal electrical power output is achieved without the application of appreciable external force being applied to the anode and cathode electrodes. This of course, is in stark contrast to that disclosed in U.S. Pat. Nos. 6,030,718 and 6,468,682 which include various current collector, and other spring and biasing arrangements which have been utilized to exert a predetermined amount of force in order to maintain effective ohmic electrical contact therebetween the current collectors disclosed in those references, and the membrane electrode diffusion assembly as described in each of those patents. As seen in the present drawings, the second portion 86 of the cathode current tab 84 is received through the gaps 46 as defined along the peripheral edge of the hydrogen distribution frame 20.

Referring still to FIGS. 1 and 2, the fuel cell module 10 of the present invention includes, as illustrated, a clamping plate which is generally indicated by the numeral 90. The clamping plate is defined by a peripheral edge 91 which has a number of apertures 92 formed therein. The apertures are substantially coaxially aligned relative to the apertures 35 which are formed in the peripheral edge 24 of the hydrogen distribution frame 20. Still further, each clamping plate, as shown, has a first MEA aperture 93 and a second MEA aperture 94. As should be understood, the size of these apertures is less than the surface area of the respective porous electrically conductive ceramic substrates 63 which are positioned on the cathode side 54 of the solid polymeric proton exchange membrane 51. Consequently, the MEA 50 is secured or captured therebetween the clamping plate 90 and the hydrogen distribution frame and within the respective cavities 31-34, respectively.

As seen in the exploded view of FIGS. 1 and 2, the first form of the PEM fuel cell module 10 of the present invention includes individual aluminum mesh or open celled aluminum foam substrates 100 which respectively rest in heat transferring relation relative to the outside facing surfaces 65 of the porous electrically conductive ceramic substrates 63 that are individually positioned on the cathode side 54 of the polymeric proton exchange membrane 51. The aluminum mesh or foam substrates 100 each facilitates the passage of air therethrough, and further conducts heat energy generated during PEM fuel cell module 10 operation away from each of the ceramic electrically conductive substrates 63 which are juxtaposed relative thereto. As should be understood, and during the operation of the proton exchange membrane fuel cell 10, the fuel cell simultaneously generates an electrical power output along with heat and water. In the arrangement as seen, the porous electrically conductive ceramic substrates 63 which are positioned on the anode and cathode sides act as heat sinks and transmit heat energy generated during the PEM fuel cell module operation away from the solid polymeric proton exchange membrane 51. The aluminum-mesh or foam substrate 100 has an inside facing surface 101 which rests in heat transferring relation thereagainst the outside facing surface 65 of the porous electrically conductive ceramic substrate 63, and which is contact with the cathode side 54, of the solid polymeric proton exchange membrane 51. As such, the aluminum mesh or foam substrate 100 conducts heat energy away from the MEA 50, and further, a stream of air 103, as illustrated in FIGS. 3 and 4, passes through the cover of the proton exchange membrane fuel cell module 10, as will be described below, and through the aluminum mesh or foam substrate, and conducts the heat energy which has been generated away from same. As should be understood, a preponderance of the heat energy generated by the operation of the fuel cell module 10 is removed by means of this cathode air flow 103 which is provided to the PEM fuel cell module 10. Additionally, this cathode air flow 103 provides the source of oxygen which is necessary for the proton exchange membrane fuel cell to generate an electrical potential. The cathode air flow is typically provided by a fuel cell power system (not shown). Other structures such as a multiple finned heat sink plate could be substituted for the aluminum foam substrate 100 without departing from the teachings of the present invention.

Referring still to FIGS. 1 and 2, the first form of the fuel cell module 10 of the present invention includes opposite cathode covers which are generally indicated by the numeral 110. As seen in FIGS. 1-4, each of the cathode covers are substantially identical and the discussion which follows will be by reference to one cathode cover, it being understood that the opposite cathode cover is substantially identical. In this regard, it will be seen that the respective cathode covers 110 have a first end 111; and an opposite second end 112. Still further, the respective cathode covers are defined by a first portion 113, and a second portion 114. The first and second portions are substantially aligned relative to the respective oppositely disposed cavities 31, 32, 33 and 34, respectively. As seen, the cathode covers are defined by a peripheral edge 115 which has a plurality of apertures 116 formed therein. These apertures are substantially aligned with the apertures 92 which are formed in the clamping plate 90. As earlier described, these apertures are further aligned with the apertures 35 which are formed in the hydrogen distribution frame 20. These coaxially aligned apertures are operable to receive individual fasteners 117 which pass therethrough. The fasteners are operable to secure the respective cathode covers 110 together thereby positioning the hydrogen distribution frame 20 which carries the respective MEAs 50 in an appropriate orientation therebetween.

The respective cathode covers each define an air passageway generally indicated by the numeral 120. The air passageway 120 includes first and second portions 121, and 122 (FIG. 4). The air passageway 120 is operable to receive the cathode air flow 103 as shown in FIG. 3. As earlier described, the cathode air flow 103 is operable to remove a preponderance of the heat energy generated during PEM fuel cell module operation. As seen by reference to FIGS. 1 and 2, the respective cathode covers 110 have an outside facing surface 123 (FIG. 1); and an opposite, inside facing surface 124. The inside facing surface 124 defines two individual cavities 125 which are operable to matingly receive the aluminum mesh or foam substrates 100 therein. As should be understood, when fully assembled, the aluminum mesh or foam substrates are positioned therealong the first and second portions 121 and 122 of the air passageway 120, and are individually secured in a given position in heat transferring relation relative to the outside facing surface 65 of the respective porous electrically conductive ceramic substrate 63. Therefore, it should be understood that the proton exchange membrane fuel cell module 10 is provided with a cathode air flow 103, and further generates an electrical power output, heat energy, and water as byproducts when rendered operational. Still further, the respective ceramic gas diffusion electrodes 61 and 62 are defined by the porous electrically conductive ceramic substrates 63 which have the catalyst layer 71, applied thereto, and which are further operable to dissipate a preponderance of the heat energy generated during proton exchange membrane fuel cell module operation to the air flow 103, and further simultaneously acts as individual current collectors for the proton exchange membrane fuel cell module 10. The respective ceramic gas diffusion electrodes 61, and 62 retain sufficient liquid water during operation of the proton exchange membrane fuel cell module 10 so as to render the proton exchange membrane fuel cell module 10 substantially self-humidifying. Additionally, the respective ceramic gas diffusion electrodes 61 and 62, as defined by the individual porous electrically conductive ceramic substrate 63, which have the catalyst layer 71 applied thereto, effectively operates as a heat sink and which transmits a portion of the heat energy generated during the operation of the proton exchange membrane fuel cell 10 so as to maintain the hydration of the polymeric proton exchange membrane 51 at an amount which facilitates the generation of the desired electrical current output. This feature is important to the present invention inasmuch as the excessive removal of hydration from the PEM fuel cell module 10 may result in an operational failure of the PEM fuel cell module. On the other hand, retention of excessive hydration in the PEM fuel cell module may result in the PEM fuel cell module "flooding out." In this condition, the PEM fuel cell module also fails to generate an optimal electrical power output. As described earlier, the proton exchange membrane fuel cell module 10 is utilized in combination with a proton exchange membrane fuel cell power system as more fully described in the earlier U.S. patents which are incorporated by reference herein. The proton exchange membrane fuel cell power system, in operation, is arranged so that each of the proton exchange membrane fuel cell modules may be readily electrically decoupled from the proton exchange membrane fuel cell power system, by hand, while the remaining proton exchange membrane fuel cell modules 10 continue to operate. As seen by reference to FIGS. 1 and 2, the respective anode current tabs 80, and cathode current tabs 84, are electrically coupled with an interface card 130. The interface card is operable to electrically couple with a suitable electrical bus which is made integral with a fuel cell power system (not shown).

Second Form

The second form of the proton exchange membrane fuel cell module which incorporates the features of the present invention is best seen by reference to FIGS. 7-9, respectively, and is generally indicated by the numeral 200. Referring now to FIG. 7B, the second form of the invention 200 includes a centrally disposed support plate which is generally indicated by the numeral 201. The central support plate 201 has a first or upper end 202, and an opposite, second, or lower end 203. Still further, the central support plate has a first substantially vertically disposed peripheral edge 204, and an opposite, second, vertically disposed peripheral edge 205. The central support plate 201 defines a plurality (5) of cavities 210, and which are designated as first, second, third, fourth and fifth cavities 211, 212, 213, 214 and 217, respectively, and which are located on the opposite sides thereof. These individual cavities are operable to receive the cathode side of the MEA as will be described in greater detail hereinafter. As seen in FIG. 7B, the central support plate 201 has a plurality of apertures 215 formed therethrough and which are positioned in given locations. These apertures are operable to receive threaded fasteners therethrough, as will be described, hereinafter, in order to secure the PEM fuel cell module 200 in an assembled configuration. In addition to the foregoing, the central support plate 201 defines a number of channels 216 which are located along the first, or upper end 202. The respective channels 220 are operable to, on the one hand, receive individual cathode current tabs, as will be described hereinafter, and further allows for the passage of air therethrough which may then come into contact with the cathode side of the MEA which will be discussed in greater detail, hereinafter. In the arrangement as seen in FIGS. 7-9, the present invention provides for a proton exchange membrane fuel cell module 200, where the cathode sides of the membrane electrode assembly (MEA), as will be described below, are proximately related one relative to the other, and the anode sides of the MEA's are distally related, one relative to the other.

Referring still to FIG. 7B, it will be seen that the proton exchange membrane fuel cell module 200 includes an anode support plate which is generally indicated by the numeral 230, and which matingly cooperates with the central cathode support plate 201. In this regard, the anode support plate 230 has a first or upper end 231, and a second or lower end 232. The anode support plate defines a plurality of apertures or cavities which are generally indicated by the numeral 233, and which are identified as first, second, third, fourth and fifth apertures 234-238, respectively. These respective apertures 234-238 are each operable to receive an individual MEA therein, as will be described in greater detail hereinafter. As illustrated in FIG. 7B, the anode support plate 230 defines first and second passageways 241 and 242, respectively. The first passageway is operable to conduct a fuel gas (not shown) to the respective cavities or apertures 234-238, respectively, by way of the smaller second passageways 244, as illustrated in the drawings. Still further, the second passageways 242 is operable to remove any unreacted fuel gas, and water generated as a result of PEM fuel cell module operation 200 and further expel it from the PEM fuel cell module 200 by way of that same passageway. As seen in FIG. 7B, a plurality of apertures 243 are formed in the anode support plate 230, and are operable to receive threaded fasteners which extend therethrough in order to secure the proton exchange membrane fuel cell module 200 in an assembled configuration.

Received within the first, second, third, fourth and fifth apertures 234-238, respectively, are individual anode perimeter seals which are generally indicated by the numeral 250. The anode perimeter seals 250 are operable to sealably couple the MEA, which will be discussed below, to the anode support plate 230. The respective anode perimeter seals 250 substantially prevent the leakage of a fuel gas, such as hydrogen, which is supplied to the anode side of the MEA from leaking to the cathode side of same, as will be discussed in greater detail, hereinafter. As seen in FIG. 7B, the second form of the proton exchange membrane fuel cell module 200 includes a gas manifold which is generally indicated by the numeral 251. The gas manifold 251 is operable to fluid matingly cooperate with the first peripheral edge 204 of the central support plate 201. In this regard, the gas manifold generally defines a first bifurcated fluid passageway 252 which has a first portion 253 and a second portion 254. As should be understood, the first bifurcated fluid passageway 252 is coupled in fluid flowing relation relative to a source of a fuel gas, such as hydrogen, and which is delivered to the first fuel gas passageway 241, as defined by the anode support plate 230. Still further, the manifold 251 has a second passageway 255 which is coupled in fluid flowing relation relative to the second passageway 242. As should be understood, unreacted fuel gas and water generated during PEM fuel cell module 200 operation is removed therethrough.

Figure 7C:
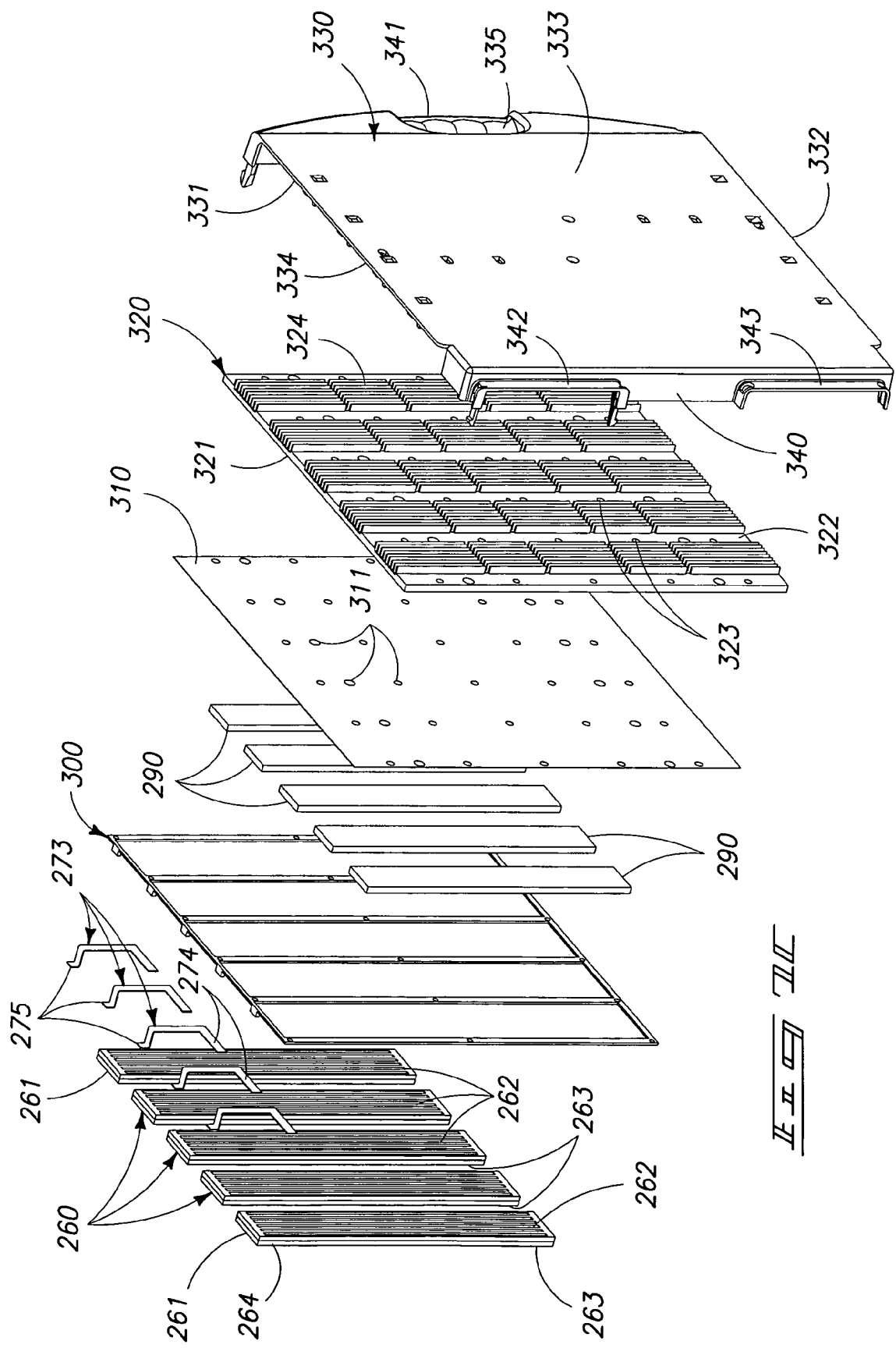

Referring now to FIGS. 7B and 7C, the second form of the proton exchange membrane fuel cell module 200 includes a plurality of membrane electrode assemblies (MEAs) 260 and which are individually received within the first, second, third, fourth and fifth apertures 234-238, respectively, as defined by the respective anode support plates 230. The MEAs 260 each include a solid polymeric proton exchange membrane 261, which is fabricated in a fashion identical to that which was disclosed with respect to the first form of the invention 10. Still further, the respective MEAs 260 each include a ceramic anode electrode 262; and an opposite, ceramic cathode electrode 263. As seen in the above drawings, in this second form of the invention 200, the arrangement of the respective MEAs 260 are such that the cathode electrodes 263 of the respective MEAs are proximately related, and the anode electrodes 262 are distally related, as will become evident hereinafter. As seen in the drawings, each of the MEAs 260 has a peripheral edge 264, and the respective anode perimeter seals 250 are operable to sealably mate thereabout the peripheral edge 250, and sealably support the respective MEAs within the apertures 234-238, respectively. As best seen by reference to FIG. 7B, the respective ceramic cathode electrodes 263 are received in the first, second, third, fourth and fifth cavities 211-214 and 217 respectively, and which are defined by the central cathode support plate 201. As will be seen hereinafter, a cathode air stream is provided, and which passes by the cathode support plate in a fashion such that oxygen from the air stream may be received by the ceramic cathode electrode 263 and thereby render the MEA operational. In all other regards, the individual MEAs are identical to that which was earlier described with respect to the first form of the invention 10, and further discussion regarding same is not warranted.

Mounted in ohmic electrical contact thereagainst the ceramic cathode electrodes 263 of each of the MEAs 260, is a cathode current tab which is generally indicated by the numeral 270. The cathode current tabs each have a first end 271 which rests in ohmic electrical contact thereagainst the ceramic cathode electrode 263, and an opposite, second end 272, which is electrically coupled to an interface bus as will be described below. Still further, and resting in ohmic electrical contact thereagainst the ceramic anode electrodes 262 of the respective MEAs 260 is an anode current tab 273, (FIGS. 7A and 7C). Similarly, the anode current tab has a first end 274 which rests in ohmic electrical contact thereagainst the ceramic anode electrode 262, and an opposite second end 275 which is electrically coupled to an interface bus 280 which matingly rests in interfitted relation across the first end 202 of the central cathode support plate 201. The interface bus 280 has a first end 281; an opposite second end 282; and opposite first and second sides 283 and 284, respectively. The respective anode and cathode current tabs 273, and 270, respectively, are electrically coupled with the opposite first and second sides 283 and 284, respectively. The interface bus is operable to conduct electrical energy generated by the PEM fuel cell module 20 to the electrical contacts 285 which are positioned on the first end 281 thereof. As such, the interface bus 280 is operable to releasably electrically couple with a proton exchange membrane fuel cell power system bus as described more fully in U.S. Pat. No. 6,468,682, the teachings of which are incorporated by reference herein.

As best seen in FIGS. 7A and 7C which are, of course, continuations of FIG. 7B discussed above, the second form of the proton exchange membrane fuel cell module 200 includes individual aluminum mesh or foam substrates which are generally indicated by the numeral 290, and which rest in heat transferring relation relative to the ceramic anode electrodes 262 which are made integral with the respective MEAs 260. The individual aluminum mesh substrates 290 are operable to conduct heat energy generated as a result of the operation of the proton exchange membrane fuel cell module 200 away from the ceramic anode electrodes 262 in order to maintain the temperature of the solid polymeric proton exchange membrane 261 at an acceptable temperature. Still further, sealably positioned about the peripheral edge of the ceramic anode electrodes 262, are individual anode external seals 300 which operate to sealably couple the respective MEAs 260 thereagainst an electrically insulating plate or frame which is generally indicated by the numeral 310, and further seals the aluminum mesh or foam 290 thereto. In this arrangement, the aluminum mesh or foam 290 provides a gas diffusion path for the delivery of the fuel gas to the MEA 260. The electrically insulating plate, or frame 310, as the name implies does not conduct electricity, and has a plurality of apertures 311 formed therein and which can receive threaded fasteners therethrough and which secures the second form of the proton exchange membrane fuel cell module 200 together. The insulating plate or frame 310 is further operable to conduct heat energy away from the ceramic anode electrodes 262. This is achieved by the transmission of the heat energy across the aluminum mesh or foam substrate 290 and through the electrically insulating plate 310. Positioned in heat transferring relation thereagainst the respective electrically insulating plate or frame 310, is an anode heat sink which is generally indicated by the numeral 320. The respective heat sinks 320 have an inside facing surface 321 which rests thereagainst the insulating plate 310, and an outside facing surface 322. Still further, a plurality of apertures 323 are formed therein and which are coaxially aligned with the apertures 311 and which are formed in the electrically insulating plate 310. Still further, the outside facing surface is defined by a number of heat radiating fins 324 which are operable to dissipate the heat energy which has been generated at the respective ceramic anode electrodes 262, and radiate the generated heat to a bifurcated air flow which is supplied to the second form of the proton exchange membrane fuel cell module 200 as will be described in greater detail, hereinafter.

As seen in FIGS. 7A and 7C, respectively, the second form of the proton exchange membrane fuel cell module 200 includes a pair of cooperating and substantially mirror imaged fuel cell module covers which are generally indicated by the numeral 330. The pair of covers matingly come together to define a cavity which receives the structures described, above. In this regard, each fuel cell module cover has a first end 331; an opposite second end 332; an outside facing surface 333; and an opposite, inside facing surface 334. Still further, each cover has a forward facing edge 335; and an opposite rearward facing edge 340. Each fuel cell module cover 330 has a handle 341 which is made integral with the forward facing edge 335, and which provides a convenient hand hold for an operator (not shown) to grasp the proton exchange membrane fuel cell module 200 and remove it, by hand, from a fuel cell power system which is similar to that described in U.S. Pat. No. 6,468,682, the teachings of which are incorporated by reference herein. Still further, the rearward edge 340 defines first and second recessed areas or regions 342 and 343, respectively, and which define apertures therebetween as seen in FIG. 9, and which permits the first end 281 of the interface bus 280 to extend therethrough, and make it accessible for electrical contact with an electrical bus which is made integral with a fuel cell power system; and further one of the apertures permits access to the gas manifold 251, and the respective passageways 252 and 255, thereof. As seen in the drawings, the inside facing surface 334, defines a plurality of discreet channels 344, and which are individually operable to matingly receive the respective heat radiating fins 324 which are made integral with the outside facing surface 322 of the respective anode heat sinks 320. As best illustrated by reference to FIGS. 8 and 9, the second form of the proton exchange membrane fuel cell module 200 is supplied with a bifurcated air flow which is generally indicated by the arrows labeled 350. The bifurcated air flow 350 includes a first air flow or stream 351 which is utilized to supply air to the ceramic cathode electrodes 263 which are made integral with each of the MEAs 260; and further, a second anode heat sink stream 352 which travels over the anode heat sink 320. The bifurcated air flow and more specifically the anode heat sink air stream 352 is operable to remove a preponderance of the heat energy generated during operation of the proton exchange membrane fuel cell module 200.

Operation

The operation of the described embodiment of the present invention is believed to be readily apparent and is briefly summarized at this point.

In its broadest aspect, the present invention relates to a proton exchange membrane fuel cell as indicated by the numerals 10 and 200 and which include a proton exchange membrane 51 and 261, respectively, and which have opposite anode and cathode sides; and individual ceramic electrodes juxtaposed relative to each of the anode and cathode sides, and wherein at least one of the electrodes is fabricated, at least in part, of a porous, electrically conductive ceramic material. In the arrangement as seen, in the various drawings the porous electrically conductive ceramic material substrate 63 comprises, at least in part, a group IVB-VIB transition metal diboride which is thermally conductive. Typically, the porous electrically conductive ceramic material substrate 63 is selected from the group comprising titanium diboride, and zirconium diboride. In the arrangement as seen in the drawings, the porous electrically conductive ceramic material substrate 63 has an electrical resistivity of less than about 60 micro-ohm-centimeter; and a porosity of greater than about 1

Gurley second. In the arrangement as described above, the proton exchange membrane fuel cell modules 10 and 200, during operation, generate water as a byproduct, and the porous electrically conductive ceramic material substrate 63 uptakes, and retains an amount of the water to render the proton exchange membrane fuel cell module 10 and 200 substantially self-humidifying. In the arrangements as described, the porous electrically conductive ceramic material substrate forming the respective electrodes for each form of the invention include a catalyst layer 71, which is applied to the inside facing surface thereof, to form a resulting electrode 61 and 62. The catalyst layers utilized in the present invention are selected from the group comprising platinum black, platinum-on-carbon; and/or a composite noble metal material. Each of the ceramic electrodes has a surface topology defined by a plurality of pores, and the proton exchange membrane 51, 261 is formed by casting a fluid proton conducting dispersion onto the individual electrodes, and subsequently creating conditions which converts the fluid proton conducting dispersion into a solid proton exchange membrane 51, and 261 having anode and cathode sides, and which substantially conforms to the surface topology of each of the electrodes 262, and 263, respectively. In another arrangement, a porous electrically insulative separator (not shown) is provided and which is positioned therebetween the individual electrodes, and the proton exchange membrane 251, 261 is made integral with the porous electrically insulative separator. In this arrangement, the proton exchange membrane substantially conforms to the surface topology of each of the adjoining ceramic electrodes. In the arrangement as seen, the proton exchange membrane fuel cell modules 10 and 200 operate at temperatures of less than 200 degrees C. In each form of the invention, as seen in the drawings, the porous electrically conductive ceramic material substrate 63 (FIG. 5) forming the respective electrodes 61 and 62 is thermally conductive, and acts as a heat sink, and further removes, in certain forms of the invention, a preponderance of the heat energy generated by the proton exchange membrane fuel cell module 10, 200 during operation.

In the two forms of the invention as seen in the drawings, the present invention 10, 200 achieves novelty over the earlier prior art patents inasmuch as the PEM fuel cell module when rendered operational has an optimal electrical power output which is achieved without the application of appreciable external force being applied to the anode and cathode electrodes 61, 62, 262 and 263, respectively. This, of course, eliminates many parts from the earlier patented structures making the present PEM fuel cell module arrangements quite advantageous. For example, the present invention allows for the elimination of parts, such as the prior art current collectors which covered nearly the entire surface area of the electrodes because the porous electrically conductive ceramic material substrate simultaneously acts as an electrical current collector for the proton exchange membrane fuel cell modules 10 and 200 as shown herein. It has been found that the present arrangement whereby the electrodes are fabricated from the porous electrically conductive ceramic material is advantageous inasmuch as the porous electrically conductive ceramic material has a pore size which increases the oxygen entrainment in the liquid water which is formed as a result of PEM fuel cell module operation. Still further, the ceramic electrode 62 and 263 further retains and dissipates sufficient liquid water so as to render the proton exchange membrane fuel cell module 10 and 200 substantially self-humidifying. In the claimed invention, the porous electrically conductive ceramic material typically has a pore size of about 5 to about 200 microns. As shown herein, the present invention 10 and 200 also relates to an electrode 61, 62, 262 and 263 for use in a proton exchange membrane fuel cell module and which has a proton exchange membrane 51, 261, and which includes a porous electrically conductive ceramic substrate 63 which is disposed in ohmic electrical contact with the proton exchange membrane, and wherein the electrode simultaneously acts as a heat sink, gas diffusion layer, and as a current collector; and further includes a catalyst layer 71 (FIG. 6) applied to the porous electrically conductive ceramic substrate 63 to form the resulting electrode. As discussed herein, the porous electrically conductive ceramic substrate 63 has a thickness of less than about 10 mm. Still further, this same structure can be formed in a molding or fabrication process into a variety of different shapes. Yet further, in the present invention 10 and 200, the proton exchange membrane 51, 261 may be fabricated in a fashion to include various ionic fluids which increase the performance of same.

In the present invention, a proton exchange membrane fuel cell module 10, 200 is disclosed and which includes a module housing 120, 330 defining a cavity, and wherein the cavity is coupled in fluid flowing relation relative to a source of air, and a source of a fuel gas. Still further, a polymeric proton exchange membrane 51, 261 is positioned within the cavity of the module housing, and wherein the polymeric proton exchange membrane has an anode and an opposite cathode side. In this arrangement, the source of air is supplied to the cathode side of the polymeric proton exchange membrane 51, 261, and the source of fuel gas is supplied to the anode side of the polymeric proton exchange membrane. In the present invention, a catalyst coating 71 (FIG. 6) is positioned in juxtaposed relation relative to each of the anode and cathode sides of the polymeric proton exchange membrane 51, 261; and a porous ceramic electrically conductive substrate 63 is positioned in covering relation relative to the catalyst coating. The porous electrically conductive ceramic substrate 63 is located on the anode and cathode side of the polymeric proton exchange membrane 51, 261, and is further positioned in ohmic electrical contact therewith. The catalyst layer, and the porous ceramic electrically conductive substrate form a ceramic gas diffusion electrode 61, 62, 262 and 263 for the anode and cathode sides of the polymeric proton exchange membrane. In the arrangement as described, when the PEM fuel cell module 10, 200 is rendered operational, the module generates an electrical current output, heat energy, and water as byproducts. The polymeric proton exchange membrane 51, 261 requires an amount of hydration in order to generate the electrical power output, and the respective ceramic gas diffusion electrodes 62, 262 each act as heat sinks to effectively transmit a portion of the heat energy generated during operation of the proton exchange membrane fuel cell module 10, 200 away from the polymeric proton exchange membrane 51, 261 so as to maintain the hydration of the polymeric proton exchange membrane at an amount which facilitates the generation of the desired electrical current output. In addition to the foregoing, the respective ceramic gas diffusion electrodes retain sufficient liquid water during operation of the proton exchange membrane fuel cell module 10, 200 so as to render the proton exchange membrane fuel cell module self-humidifying. In one form of the invention 200, the cathode sides of the respective polymeric proton exchange membranes 261 are disposed in spaced, proximal relation, one relative to the other, and the respective anode sides 262 are distally related. In another form of the invention 10, the reverse is the case, that is, the anode sides of the respective polymeric proton exchange membranes are disposed in spaced, proximal relation, one relative to the other, and the respective cathode sides are distally related, one relative to the other.

Therefore, it will be seen that the present fuel cell modules 10 and 200 when used with a fuel cell power system has numerous advantages over the prior art teachings as found in U.S. Pat. Nos. 6,030,718 and 6,468,682, the teachings of which are incorporated by reference herein.

These advantages include the elimination of many parts and assemblies required for the operation in these previous prior art devices and a greater simplicity in construction and assembly. Moreover, in view of the highly efficient manner in which heat energy is dissipated from the PEM fuel cell modules as discussed herein, and electrical current is collected from same, enhanced current densities are achieved, and further, the present invention is operable for use in a widely divergent temperature environment. Finally, the present invention provides many advantages over the prior art fuel cells which employ stack-like arrangements by reducing or eliminating various control measures and balance of plant requirements which are necessary to render such arrangements operational.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A proton exchange membrane fuel cell, comprising:
    a proton exchange membrane having opposite anode and cathode sides; and
    individual electrodes juxtaposed relative to each of the anode and cathode sides, and wherein at least one of the electrodes is fabricated of a single porous, electrically conductive ceramic material that comprises a group IVB-VIB transition metal diboride which is thermally conductive.

2. A proton exchange membrane fuel cell as claimed in claim 1, and wherein the single porous electrically conductive ceramic material has an electrical resistivity of less than about 60 micro-ohm-centimeter.

3. A proton exchange membrane fuel cell as claimed in claim 1, and wherein the single porous electrically conductive ceramic material has a porosity of greater than about 1 Gurley second.

4. A proton exchange membrane fuel cell as claimed in claim 1, and wherein the proton exchange membrane fuel cell, during operation, generates water as a byproduct, and wherein the single porous electrically conductive ceramic material uptakes, and retains an amount of the water to render the proton exchange membrane fuel cell substantially self-humidifying.

5. A proton exchange membrane fuel cell as claimed in claim 1, and wherein the single porous electrically conductive ceramic material has an inside facing surface, and wherein a catalyst layer is applied to the inside facing surface of the single porous electrically conductive ceramic material to form the electrode.

6. A proton exchange membrane fuel cell as claimed in claim 5, and wherein the catalyst layer is selected from the group comprising platinum black, platinum-on-carbon, and/or a composite noble metal material.

7. A proton exchange membrane fuel cell as claimed in claim 1, and wherein each electrode has a surface topology defined by a plurality of pores, and wherein the proton exchange membrane is formed by casting a fluid proton conducting dispersion onto the individual electrodes, and subsequently creating conditions which convert the fluid proton conducting dispersion into a solid proton exchange membrane having anode and cathode sides, and which substantially conforms to the surface topology of each of the electrodes.

8. A proton exchange membrane fuel cell as claimed in claim 1, and wherein each electrode has a surface topology defined by a plurality of pores, and wherein the proton exchange membrane fuel cell further comprises:
    a porous electrically insulative separator positioned between the individual electrodes, and wherein the proton exchange membrane is made integral with the porous electrically insulative separator, and wherein the proton exchange membrane substantially conforms to the surface topology of each of the electrodes.

9. A proton exchange membrane fuel cell as claimed in claim 1, and wherein the operational temperature of the proton exchange membrane is less than about 200 degrees C.

10. A proton exchange membrane fuel cell as claimed in claim 1, and wherein both the anode and cathode electrodes are fabricated from the single porous, electrically conductive ceramic material, and wherein each electrically conductive ceramic material has a catalyst layer applied thereto.

11. A proton exchange membrane fuel cell as claimed in claim 1, and wherein the proton exchange membrane fuel cell generates heat energy during operation, and wherein the single porous, electrically conductive ceramic material is thermally conductive and acts as a heat sink, and further removes more than half of the heat energy generated by the proton exchange membrane fuel cell during operation.

12. A proton exchange membrane fuel cell as claimed in claim 1, and wherein each electrode has a surface topology, and wherein the proton exchange membrane substantially conforms, at least in part, to the surface topology of at least one of the electrodes.

13. A proton exchange membrane fuel cell as claimed in claim 1, and wherein each of the anode and cathode electrodes are fabricated from the single porous, electrically conductive ceramic material, and wherein the respective anode and cathode electrodes maintain effective ohmic electrical contact with the proton exchange membrane without the application of an external force.

14. A proton exchange membrane fuel cell as claimed in claim 1, and wherein the proton exchange membrane fuel cell, during operation, generates electrical current, and wherein the at least one electrode which is fabricated, at least in part, of the single porous, electrically conductive ceramic material simultaneously acts as an electrical current collector for the proton exchange membrane fuel cell.

15. A proton exchange membrane fuel cell as claimed in claim 1, and wherein the proton exchange membrane fuel cell consumes oxygen, and generates liquid water as a byproduct during operation, and wherein the at least one electrode which is fabricated, at least in part, of the single porous, electrically conductive ceramic material is the cathode electrode, and wherein the single porous, electrically conductive ceramic material has a pore size which increases the oxygen entrainment in the liquid water, and which further retains and dissipates sufficient liquid water so as to render the proton exchange membrane fuel cell substantially self-humidifying.

16. A proton exchange membrane fuel cell as claimed in claim 1, and wherein the at least one electrode which is fabricated, at least in part, of the single porous, electrically conductive ceramic material has a pore size of about 5 to about 200 microns.

17. An electrode for use in a proton exchange membrane fuel cell and which has a proton exchange membrane, comprising:
- a single porous electrically conductive ceramic substrate which is fabricated from the group which comprises titanium diboride or zirconium diboride and which is disposed in ohmic electrical contact with the proton exchange membrane, and which simultaneously acts as a heat sink, gas diffusion layer, and as a current collector, and wherein the proton exchange membrane operates at a temperature of less than about 200 degrees C., and which produces heat and water as byproducts, and wherein the single porous electrically conductive ceramic substrate is formed into a shape, and further has a pore size of about 5 to about 200 microns, and wherein the electrode retains sufficient liquid water to render the proton exchange membrane fuel cell, at least in part, self-humidifying; and
- a catalyst layer applied to the single porous electrically conductive ceramic substrate.

18. An electrode as claimed in claim 17, and wherein the single porous electrically conductive ceramic substrate has an electrical resistivity of less than about 60 micro-ohm-centimeter.

19. An electrode as claimed in claim 17, and wherein the proton exchange membrane fuel cell includes a polymeric proton exchange membrane, and wherein the single porous electrically conductive ceramic substrate, acting as a heat sink, removes sufficient heat from the polymeric proton exchange membrane so as to substantially prevent the polymeric proton exchange membrane from becoming operationally degraded.

20. An electrode as claimed in claim 19, and wherein the single porous electrically conductive ceramic substrate maintains a substantially optimal ohmic resistance of less than about 150 micro-ohm-centimeter with the polymeric proton exchange membrane without the use of any mechanical force application assemblies.

21. A proton exchange membrane fuel cell, comprising:
- a proton exchange membrane having opposite anode and cathode sides; and individual electrodes juxtaposed relative to each of the anode and cathode sides, and wherein at least one of the electrodes is fabricated of a single porous, electrically conductive ceramic material that is selected from the group comprising titanium diboride, and zirconium diboride.

* * * * *